(12) United States Patent
Rive

(10) Patent No.: US 6,301,666 B1
(45) Date of Patent: Oct. 9, 2001

(54) METHOD AND APPARATUS FOR REMOTELY ENABLING A PREINSTALLED AND PREVIOUSLY DISABLED APPLICATION ON A COMPUTER SYSTEM

(75) Inventor: Russell Rive, Palo Alto, CA (US)

(73) Assignee: Everdream, Inc., Fremont, CA (US)

(*) Notice: Subject to any disclaimer, the term of this patent is extended or adjusted under 35 U.S.C. 154(b) by 0 days.

(21) Appl. No.: 09/418,699

(22) Filed: Oct. 15, 1999

Related U.S. Application Data

(60) Provisional application No. 60/151,676, filed on Aug. 31, 1999.

(51) Int. Cl.[7] .................................................. G02B 19/00
(52) U.S. Cl. ................................ 713/200; 713/201; 707/9
(58) Field of Search .................................... 713/200, 201; 707/9

(56) References Cited

U.S. PATENT DOCUMENTS

| | | |
|---|---|---|
| 4,356,545 | 10/1982 | West . |
| 4,695,946 | 9/1987 | Andreasen et al. . |
| 4,823,343 | 4/1989 | Takahashi . |
| 5,179,695 | 1/1993 | Derr et al. . |
| 5,287,505 | 2/1994 | Calvert et al. . |
| 5,361,358 | 11/1994 | Cox et al. . |
| 5,361,359 * | 11/1994 | Tajalli et al. ......................... 713/200 |
| 5,367,667 | 11/1994 | Wahlquist et al. . |
| 5,367,682 | 11/1994 | Chang . |
| 5,388,252 | 2/1995 | Dreste et al. . |
| 5,390,324 | 2/1995 | Burckhartt et al. . |
| 5,392,095 | 2/1995 | Siegel . |
| 5,432,934 * | 7/1995 | Levin et al. ......................... 713/200 |
| 5,448,045 | 9/1995 | Clark . |
| 5,455,933 | 10/1995 | Schieve et al. . |
| 5,657,473 | 8/1997 | Killean et al. . |
| 5,678,002 | 10/1997 | Fawcett et al. . |
| 5,694,528 | 12/1997 | Hube . |
| 5,732,212 | 3/1998 | Perholtz et al. . |
| 5,732,268 | 3/1998 | Bizzarri . |
| 5,743,743 * | 4/1998 | Ho et al. .............................. 434/236 |
| 5,826,012 | 10/1998 | Lettvin . |
| 5,854,828 | 12/1998 | Kocis et al. . |
| 5,933,646 * | 8/1999 | Hendrickson et al. .............. 713/100 |
| 5,944,820 | 8/1999 | Beelitz . |
| 5,974,567 | 10/1999 | Dickson, Jr. et al. . |
| 5,982,891 | 11/1999 | Ginter et al. . |
| 6,016,536 | 1/2000 | Wu et al. . |
| 6,078,322 | 6/2000 | Simonoff et al. . |
| 6,091,412 | 7/2000 | Simonoff et al. . |
| 6,094,654 | 7/2000 | Van Huben et al. . |
| 6,125,387 | 9/2000 | Simonoff et al. . |

OTHER PUBLICATIONS

"NT System Policy Editor", http://scilnet.fortlewis.edu/tech/Users/Policies_NT.htm.

*PC World Philippines* "System Policy Editor", http://www.pcworld.com.ph/backissues/pc1098/features/article2/page8.html.

(List continued on next page.)

*Primary Examiner*—Ly V. Hua
(74) *Attorney, Agent, or Firm*—Blakely, Sokoloff, Taylor and Zafman

(57) ABSTRACT

A method of providing a preconfigured computer system to a user commences with the installation of first and second applications on the computer system. The computer system is then configured to restrict access to the first application by a user, so as to inhibit ready and convenient execution of the first application by the user. However, access to the second application is not restricted, so that this second application can be executed or invoked in a usual and convenient manner. The computer system is then supplied to an end user, with the first and second of applications installed thereon. Responsive to a subsequent request from the user, the restrictions on the access to the first application are removed so as not to inhibit the execution of the first application by the user.

7 Claims, 19 Drawing Sheets

OTHER PUBLICATIONS

Motive communications Web page, http://www.motive.com/home.html.
*Fortune*, "Cool companies", http://www.pathfinder.com/fortune/cool/centerbeam.html.
"CenterBeam—Making the Internet work for small business", http://www.centerbeam.com.
*New Riders*: "Inside Windows 98", *System Policies and User Profiles*, Chapter 29, http://pbs.mcp.com/ebooks/156205788X/ch29/ch29.htm.
*PC Magazine OnLine*, "Partition Commander", Jay Munro, Sep. 17, 1998, http://search.zdnet.com/pcmag/firstlooks/9809/f980917a.html.
*PC Magazine OnLine*, "Software Partition Commander", http://search.zdnet.com/pcmag/firstlooks/9809/f980917ala.html.
*Webopedia*, "Partition", http://webopedia.internet.com/TERM/p/partition.html.
*Silicon Knight Computing Services*, "The Windows 95 Registry", http://siliconknight.com/windowsregistry.
*TechWeb*, "The Registry Revealed", http://www.winmag.com/library/1997/0201/featu159.htm.
*Microsoft Product Insider*, "Easy Access to the Registry Editor in Windows 95", http://www.microsoft.com/insider/windows95nt/tips/easyto.htm.
*PCWeek Labs*, "Registry and System Policy Editor are valuable Windows 95 resources", Aug. 21, 1995, http://www.zdnet.com/pcweek/sr/0821/tdate.html.
*PC Magazine OnLine*, "Partitioning Your Hard Disks", Neil Randall, http://www.zdnet.com/pcmag/pctech/content/16/11/tu1611.001.html.
"How it Works—Partition Tables", Hale Landis, Version 1c, (landis@sugs.tware.com).
Motive Communications, "Motive Duet", http://www.motive.com/prod_duet.html.
V Communications Web Site, "Announcing Partion Commander" http://www.v-com.com/products/pc.html.
Microsoft Corporation, "Registry", http://spyder.macarthur.uws.edu.au/iishelp/iis/htm/core/iiregtop.htm.
Tivoli Home Page, http://www.tivoli.com.
Tivoli Products & Solutions, http://www.tivoli.com/products/.
*ZDNet*, "Centerbeam aims for one–stop–IT", Margaret Kane, Aug. 9, 1999, http://www.zdnet.com/zdnn/stories/news/0,4586,2309952,00.html.
*TechWeb*, "Help Is On The Way", Aaron Ricadela, Aug. 9, 1999, http://www.informationweek.com/747/help.htm.
*SF Gate, Business & Finance*, "Startup Launching PC Service Smallfirms to get constant tech support at low cost", Henry Norr, Aug. 9, 1999, http://www.sfgate.com/cgi–bin/article,cgi?file=/chronical/archive/1999/08/09/BU98412.DTL.
*PC Magazine OnLine*, "Lock Your Desktop", Mark Sweeney, Aug. 1, 1999, http://www./zdnet.com/pcmag/pctech/content/18/14/ut1814.001.html.
*ZDNet*, "Soup–to–Net Service Planned For Small Firms", Todd Spangler, Aug. 9, 1999, http://www.zdnet.com/intweek/storeis/news/0,4164,2310864,00.htm.
*InfoWorld Electric*, "Ex–Novell execs push virtual IT service", Michael Vizard and Jessica Davis, Aug. 9, 1999, http://www.infoworld.com/cgi–bin/displayStory.pl?99089.hnlaube.htm.
*Computer Resellers News*, "CenterBeam Looks To Bring Outsourcing To The Masses", Barbara Darrow, Aug. 6, 1999, http://www.crn.com/serach/display.asp?ArticlelD=8245.
*Wired News*, "Technical Suport Goes Off Hold", James Glave, May 18, 1998, http://www.wired.com/news/news/technology/story/12352.html.
*NetworkWorld Reprint Internetworks*, "Tivoli refugees tackle tech support automation", Bob Brown, Aug. 3, 1998, vol. 15, No. 31, htto://www.motive.com/news_articles_networkworld.html.
*Computerworld*, "No rush to online help desks", Kin Girard, Jul. 6, 1998, http://www.computerworld.com/home/print.nsf/all/9807065872.
*Red Herring*, "CenterBeam finds support for IT outsourcing", Lawrence Aragon, Aug. 11, 1999, http://www.redherring.com/insider/1999/0811/vc–center.html.
*Microsoft Windows Update*, "System Policy Editor", Aug. 15, 1999, http://www.microsoft.com/Windows95/downloads/contents/WUAdminTools/S_.../Default.as.
*Reviews 'r' Us*, "Partition Commander", http://www.reviews–r–us.com/software/partcomm.htm.
*Troubleshooting and Configuring the Windows NT/94 Registry*, Chapter 28, "System Policy Editor: Understanding Policy Files", http://docs.rinet.ru/Registratura/htm/ch28.htm.
*Windows95 Annoyances*, "Getting to Know the Registry", 1995–1999, http://www.annoyances.org/win95/registry.html.

* cited by examiner

| BOOT INDICATOR (BYTE 1) | STARTING HEAD FOR PARTITION (BYTE 2) | STARTING CYLINDER AND SECTOR PARTITION (BYTES 2-3) | PARTITION TYPE (BYTE 5) | ENDING HEAD OF PARTITION (BYTE 6) | ENDING CYLINDER AND SECTOR PARTITION (BYTES 7-8) | RELATIVE SECTOR OFFSET OF PARTITION (BYTES 9-12) | TOTAL NO. OF SECTORS IN PARTITION (BYTES 13-16) |
|---|---|---|---|---|---|---|---|

FIG. 2

METHOD AND APPARATUS FOR REMOTELY ENABLING A PREINSTALLED AND PREVIOUSLY DISABLED APPLICATION ON A COMPUTER SYSTEM

This application claims priority under 35 U.S.C. §119 (e) from U.S. provisional application Ser. No. 60/151,676, filed Aug. 31,1999, and entitled "METHOD AND APPARATUS FOR CONFIGURING A HARD DISK AND FOR PROVIDING SUPPORT FOR A COMPUTER SYSTEM"

FIELD OF THE INVENTION

The present invention relates generally to the field of information technology (IT) support and, more specifically, to a method of providing a pre-configured computer system to an end user and remotely altering the configuration of the computer system.

BACKGROUND OF THE INVENTION

When ordering a computer system from a supplier or manufacturer, a user (e.g., an individual or business concern) is usually presented with a number of configuration options. The configuration options include the choice of a number of software packages that may be installed on the computer system. These software packages typically have certain base content (e.g., an operating system and certain basic applications), and certain optional content (e.g., programs that define the package). Certain software packages may be bundled with certain hardware configurations, on the assumption that a computer system having hardware typically required in a business environment will require business software, whereas a computer system having a hardware configuration more suitable for home use or will typically require other applications.

Following the purchase of a computer system, should a user wish to install further applications, these are usually not purchased from the supplier of the computer system, but from a software vendor. Software applications purchased subsequent to the initial purchase of the computer system must then be installed in the computer system, which may be a time consuming process or even beyond the technical abilities of a user of the computer system for computer users. Within large organizations, technical support is usually available to perform the installation, or at least to assist therein. However, for the home user, or in small and medium size organizations, such technical support may not be available, and the user may be required to install the application without support. Should problems be encountered with the installation, the user may have to consult an outside technical support operation for assistance that may be costly and time consuming.

SUMMARY OF THE INVENTION

According to a first aspect of the present invention, there is provided a method of supplying a computer system to a user. First and second applications are installed on a computer system, access to the first application by the user is restricted so as to inhibit execution of the first application by the user. Access to the second application by the user is not restricted, so as not to inhibit execution of the second application by the user. The computer system, with the first and second applications installed thereon, is then supplied to the user. Responsive to a request from the user, the restrictions on the access to the first application by the user may be removed so as not to inhibit execution of the first application by the user.

In an exemplary embodiment, the access by the user to the first application may be restricted utilizing a setting within a system registry (or registry database) of an operating system installed on the computer system.

In a further exemplary embodiment, access to the first application by the user may be restricted utilizing a setting within a system policy data structure of an operating system installed on the computer system.

In an even further exemplary embodiment, the removal of the restrictions on the access to the first application may be performed remotely by a support provider utilizing network communications.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is a diagrammatic representation of the structure of a partition table entry, that may be utilized according to the teachings of the present invention.

DETAILED DESCRIPTION

Figure 1:
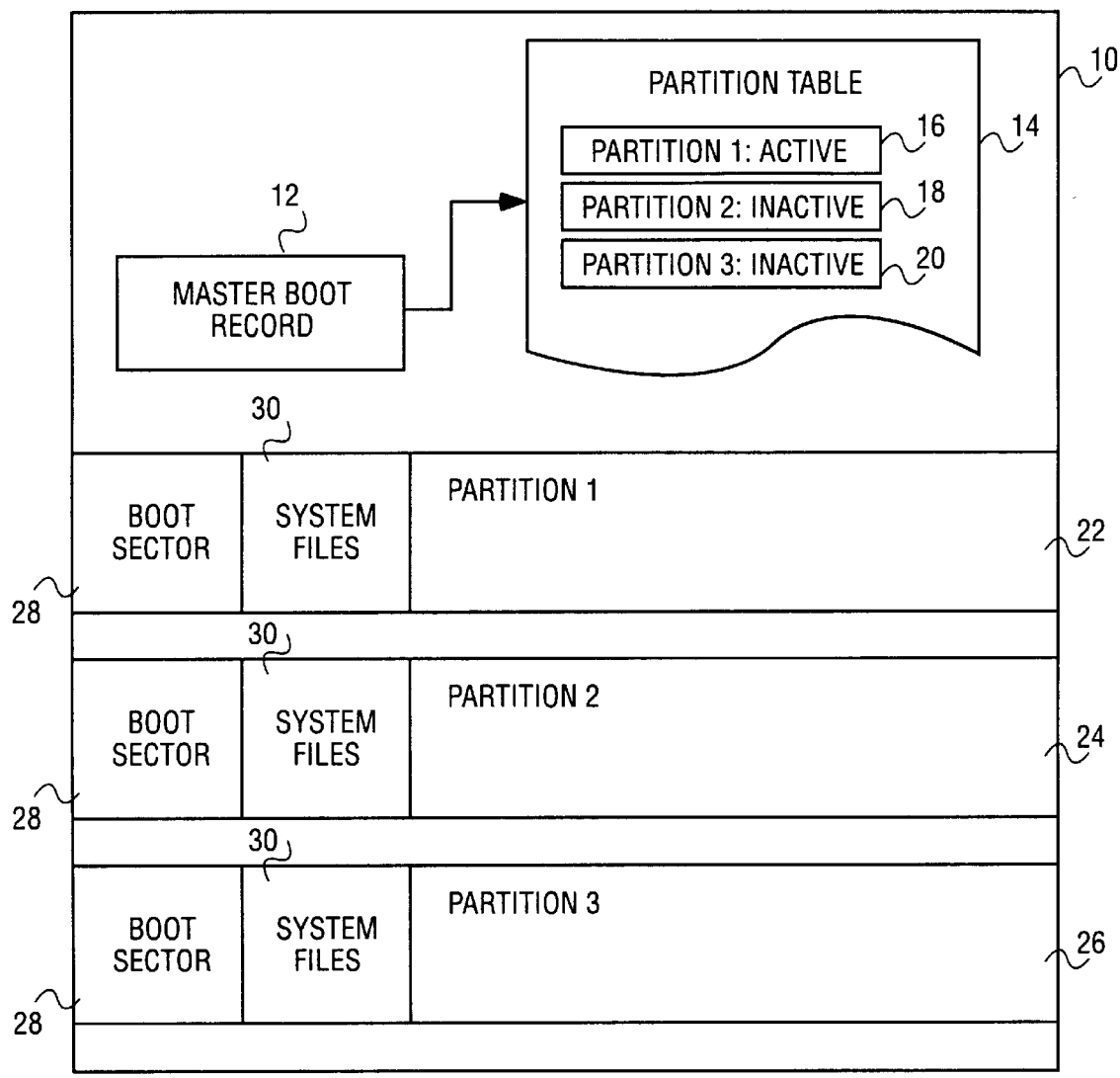
FIG. 1 is a diagrammatic representation of a hard drive, that may be configured according to an exemplary embodiment of the present invention.

A method of supplying a computer system to a user, and a method and apparatus for configuring a computer system for supply to a user, are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present invention, the term "storage device" shall be taken to refer to any device or medium that capable of storing information (e.g., code or data). Accordingly, the term "storage device" shall be taken to encompass, but not be limited to, hard drives, hard disks, hard disk drives, fixed disks, fixed disk drives, Winchester drives, floppy drives, removable drives, removal disk drives, magnetic disk drives, optical disk drives, magneto-optical disk drives or the like.

For the purposes of this specification the term "partition" shall be taken to refer to any division of data that is accessible by a computer system. Accordingly, for purposes of the present specification, the term "partition" shall be taken to include, but not be limited to, both hard partitions defined on the storage medium, and soft partitions that merely create views of data without performing any physical division of a body of data. Accordingly, the term "partition" may, in one exemplary embodiment of the present invention, be taken to refer to a section of main memory or a mass storage device that has been reserved for a particular operating environment or a particular application.

Overview of Exemplary Storage Device

The present invention is described as being implemented utilizing a storage device in the exemplary form of a "hard drive", and a description of an exemplary embodiment of the present invention will be provided below within this content. It will however be appreciated that the broader teachings of the present invention are not limited to a hard drive, and could be implemented utilizing any storage device accessible by a computer device, either directly or remotely.

Hard drives are utilized as internal storage devices used in many computer systems. Programs and data are stored on the hard drive in the form of binary 1's and 0's, represented by magnetic flux patterns. Data is written to, and read from, the hard drive in units termed "sectors" that constitutes 512-bytes. Sectors may be organized on a hard drive in a matrix of cylinders, heads and sectors, and cylinder/head/sector (CHS) may be utilized to implement such an organization. A typical hard drive consists of a number of round platters that are stacked on top of each other, with tracks defined as concentric circles on both sides of each platter. Read/write heads are attached to a ganged assembly that moves all the heads in unison, with one head for each side of each respective platter. Cylinders refer to sets of tracks, or concentric circles, and a sector is a portion of a track that holds 512-bytes of data. Each track is typically divided into 8 sectors. Hard drives are usually formatted at a manufacturing facility, this format defining the tracks and sectors of the relevant hard drive.

Operating systems (e.g., the various Windows operating systems, the Macintosh operating system, or various flavors of the Unix operating system) define one or more partitions on a hard drive. Within the operating environments provided by the Windows 95/98 operating systems, a partitioning utility may be invoked utilizing the FDISK command, and a logical formatting may be performed utilizing the FORMAT command. Similar functions are provided within other operating systems.

An exemplary description of the partitioning of a storage device, in the exemplary form of a hard drive will be described with reference to FIGS. 1 and 2. Specifically, when executing the FDISK command within the DOS/Windows 95/98 operating environments, a formatting program creates a 1-sector Master Boot Record (MBR) 12 for the hard drive 10 on the first sector of the hard drive 10 that is being partitioned. The MBR 12 is also known as a Master Book Sector (MBS), a partition sector or a Master Partition Sector (MPS). The FDISK function may also be used to define additional partitions on a hard drive 10 that already has a MBR 12 defined by the same, or another, operating system.

Upon boot of a computer system, the MBR 12 obtains a program that finds all partitions, defined on the hard drive 10, by referencing a partition table 14, and any extended partition tables (not shown), that list all defined partitions. Specifically, the partition table 14 contains a record (or entry) 16, 18 or 20, for each partition 22, 24 or 26 defined within the hard drive 10. Each partition 22,24 and 26 is shown to include a boot sector 28, that includes boot code, and system files 30. The MBR 12 identifies a partition that is indicated within the partition table 14 as being active and loads the boot sector 28 to the active partition. As described below, the boot sector 28 contains boot code that then loads the system files 30 on a partition. The system files 30, once loaded, may in turn load other files within the relevant partition. Accordingly, while each partition 22,24 and 26 includes a boot sector 28 including boot code, only the boot code contained in the boot sector 28 for the active partition is executed.

Partition Table

The partition table 14 is typically contained, together with the MBR 12, within the first physical sector of the hard drive 10. The table 14 is typically 64-bytes long, and comprises four 16-byte partition table entries 32. FIG. 2 illustrates an exemplary structure for a partition table entry 32, which is implemented in most operating systems. Of particular interest is the boot indicator byte 34, that indicates whether the relevant partition is active or inactive. Should the partition table 14 indicate no active partition, the relative hard drive 10 will not boot. If more than one partition is indicated within the partition table 14 to be active, an error message is typically generated.

Also of interest is the partition type byte 36 that indicates a partition type. While many different operating systems utilize specific partition type codes to identify partition types recognized by the relevant operating system, a number of common partition types exist. Common partition type codes may indicate an unused partition table entry, a primary partition or an extended partition. Furthermore, the partition type codes may indicate the type of file disk system employed within the relevant partition. For example, the partition type code may indicate the relevant partition as implementing a File Allocation Table (FAT) file system, a VFAT file system, a FAT32 file system, a NTFS file system, a HP file system, or an EXT2 file system (Linux).

Registry File/Database

Figure 3:
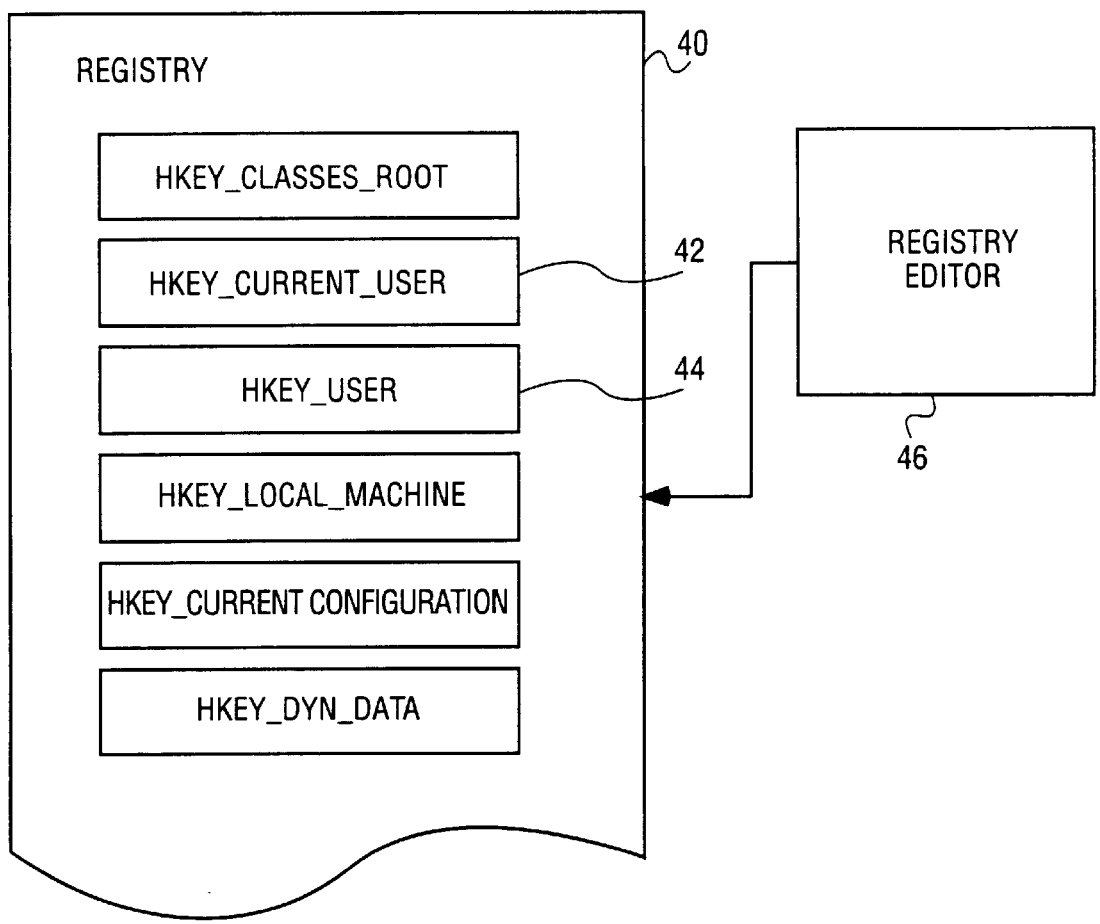
FIG. 3 is a diagrammatic representation of an exemplary registry, that may be referenced and modified, according to the teachings of the present.

FIG. 3 is a block diagram providing a diagrammatic representation of a registry 40 that may be utilized in an exemplary embodiment of the present invention. While the above discussion with reference to FIG. 3 describes the registry 40 implemented by the Windows 95 operating system, for the purposes of the present specification, the terms "registry", "registry file" and "registry database" shall be taken to encompass any data structure that stores settings particular to a particular operating environment implemented on a computer system. The operating environment may, merely for example, be dictated by a particular operating system when stored within a specific partition.

Turning specifically to the registry 40 shown in FIG. 3, the registry 40 comprises a database of settings for the Windows 95 operating system, and is contained within two hidden files, namely in the USER.DAT and SYSTEM.DAT. The registry 40 has a hierarchical structure, with each node, or branch, termed "key". Each key can contain child keys, as well as values. These values constitute the actual setting information stored by the registry 40. There are three types of values, namely string, binary and DWORD values, utilized depending on the content.

The registry 40 of the Windows 95 operating system includes three primary branches, each of which contains specific substantive information stored within the registry 40. FIG. 3 illustrates these six branches, each of which is prefaced by the acronym "HKEY". Of interest to an understanding of an exemplary embodiment of the present invention is the HKEY_CURRENT_USER branch 42 that points to a part of the HKEY_USER branch 44, that in turn contains certain preferences for each user of a computer system. Specifically, although an operating system may be configured for multiple users, one user is usually designated as the default user. The various values contained within the registry 40 are shown to be modifiable by a registry editor 46, that constitutes an application included within the Windows 95 operating system that enables a user to view and edit the contents of the registry 40. Various screen shots of a window presented by the registry editor 46 are discussed below.

Storage Device Configured with Multiple Partitions

Figure 4:
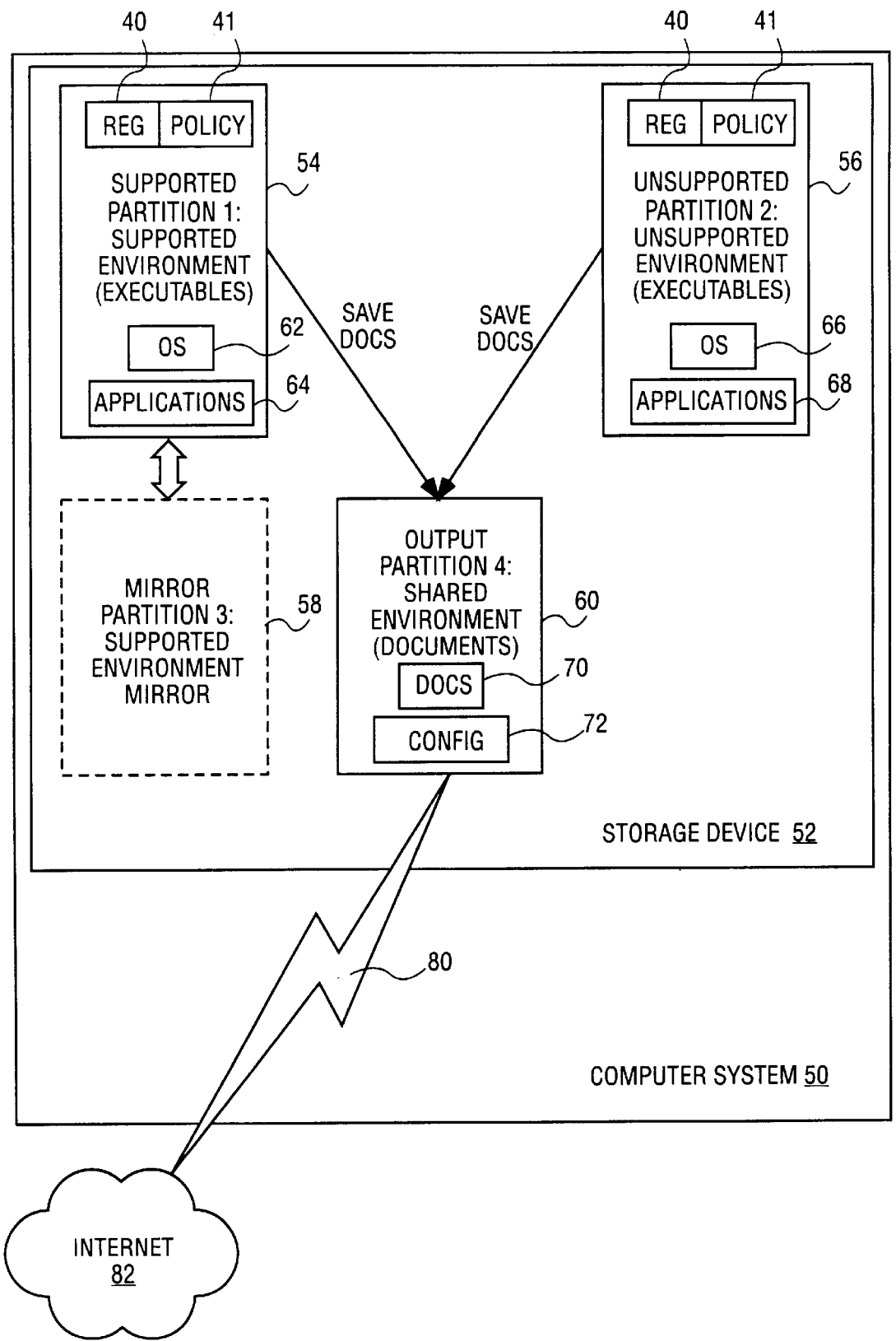
FIG. 4 is a block diagram illustrating a computer system, including a storage device, that is configured according to an exemplary embodiment of the present invention.

FIG. 4 is a block diagram illustrating a computer system 50, configured according to an exemplary embodiment of the present invention. Specifically, the computer system 50 is shown to include a storage device, in an exemplary form of a hard drive 52, that is configured to include four partitions, each of which supports an operating environment. While the storage device is shown to be included within the computer system 50, the present invention requires that the storage device merely be accessible by the computer system 50, and could be external to the computer system 50 and, for example, accessed over a network. Alternatively, the storage device may be a hard drive 52 that is directly accessible by the computer system 50.

The hard drive 52 is shown to include four partitions, namely a supported partition 54 from which a supported environment is implemented, an unsupported partition 56 from which an unsupported environment is implemented, a mirror partition 58 and an output partition 60. The partitions 54,56,58 and 60 may be defined utilizing the FDISK program, or any of a number of commercially available disk partitioning programs. The supported partition 54 is supported by a support service (e.g., an IT technical support company) and, in addition to the boot sector 28 and system files 30, includes operating system software 62 and application software 64. The supported partition 54 is distinguished in that the content of the partition 54, which implements a supported operating environment, is protected from user modification when the supported operating environment is implemented by the computer system 50 and the supported partition 54 is designated as the active partition. The protection of the supported partition 54 may, according to an exemplary embodiment of the present invention, be implemented in a number of ways. First, user modification of the content of the supported partition 54 may be prevented by assigning appropriate values to a registry 40 stored in the supported partition 54, and applicable to the supported operating environment. For example, access to the hard drive 52 or any other drive included within the computer system 50, by a particular user may be prohibited by storing an appropriate value within the registry 40 of the supported partition 54. Further details regarding the attributing of such a value within the registry 40 are provided below.

Second, a user may, according to a further aspect of the invention, be prevented from modifying the content of the supported partition 54 by setting appropriate indicators within a policy file 41 for the supported partition 54. For example, for local users of the computer system 50, access to various control panels may be restricted, folders and task bars that are commonly utilized to modify an operating environment may be removed, and other icons or mechanisms for configuring or accessing tools for modifying the supported environment may be hidden or disabled. The policy file 41 may be edited utilizing a system policy editor application program, a number of which are commercially available.

The content of the supported partition 54 is furthermore protected from these modifications in a third way that involves the storage of a persistent copy of the content of the supported partition 54 within the mirror partition 58 of the hard drive 52. The content of the mirror partition 58 is removed from user access in a similar manner to that described above by assigning appropriate values to a registry 40, and providing appropriate settings within a policy file 41, stored within the mirror partition 58. Indeed, the mirror partition 58 is hidden from user view. The content of the mirror partition 58, which is an exact duplicate of original and supported content of the supported partition 54, is not executed, and the computer system 50 is not booted from the mirror partition 58. In this way the content of the mirror partition 58 is not subject to modification or corruption. It should be noted that the content of the mirror partition 58 (i.e., the persistent copy of the supported partition 54) may be the content of the supported partition 54 as originally installed. Accordingly, the content of the mirror partition 58 is only conformed to the content of the supported partition 54 upon initial installation so as to constitute a persistent copy, or snapshot, of the original and unmodified content of the supported partition 54. In summary, one aspect of the present invention proposes that the content of the supported partition 54 be protected from user modification by overwriting the content of the supported partition 54 with the content of the mirror partition 58 on the occurrence of a predetermined event (e.g., on booting of the computer system, on the detection of a variance between the contents of the partitions 54 and 58, or upon a system failure) or on a regular and scheduled basis (e.g., once a day or once a month). In this way, should a sophisticated user manage to bypass the restrictions placed on access to supported partition 54, or should a virus or execution error modify the content of the supported partition 54, this content can be restored to an original state by replacing the content of the supported partition 54 with the content of the mirror partition 58.

In one embodiment of the present invention, this overwriting operation may be performed by inserting a "repair" floppy disk into the computer system 150, the disk containing a "copy program" that overwrites the content of supported partition 54 with the contents of the mirror partition 58.

The "copy program" may be a simple script that formats the supported partition 54 (e.g., using the "format command, and then copies the content of the mirror partition 58 to the newly formatted supported partition 54 (e.g., using the "copy" command. Accordingly, the original, installed content of the supported partition 54, a copy of which is maintained in the mirror partition 58, in one exemplary embodiment, may be labeled the "supported content" of the supported partition 54.

In summary, the content of the supported partition 54 is protected from modification in that it is protected from user modification when the supported partition 54 is active by appropriate settings within the registry 40 and the policy file 41, and is universally protected from modification, by a user or otherwise and whether the partition is active or not, by maintaining the persistent copy of the protected content in the mirror partition 58.

Turning now to the unsupported partition 56, the content of this partition 56 is not protected from modification, by the user or otherwise, in that little or no restriction is imposed upon user access to the contents of this partition by the registry 40 or the policy file 41 for this partition. While the registry 40 and the policy file 41 may contain certain restrictions, for example established by a network supervisor, user access to the content of this partition 56 is not restricted in the manner that access to the content of the supported partition 54 is restricted. The unsupported partition 56 is also shown to include an operating system 66 and application programs 68 that may or may not correspond to the operating system 62 and application programs 64 of the first partition. Accordingly, a user is free, when operating within an unsupported environment implemented utilizing the unsupported partition 56, to install any applications or other software within this partition 56, and then to execute such software. On the other hand, when operating within the supported operating environment implemented utilizing the supported partition 54, a user is prevented from installing any applications within the supported partition 54.

Returning now to the output partition 60, in a manner similar to the unsupported partition 56, access to this partition by a user is not restricted, and this partition 60 is characterized in that it stores changing, or variable, information generated by at least the supported partition 54. This variable information may include, merely for example, output documents 70 of the application program 64 of the supported partition 54. These output documents 70 may comprise, merely for example, user-generated documents such as word processor documents. The output partition 60 also stores configuration data 72 required by the operating system 62 and the application program 64 of the supported environment. Certain applications access configuration and setting files that record user preferences and settings. For example, where the application program 64 is a browser, the user-specific "bookmarks" that are displayable by the browser application are stored as configuration data 72 within the output partition 60. Similarly, word processor, spreadsheet and many other application programs may access setting or configuration files that constitute the configuration data 72 stored within the output partition 60.

E-mail messages are another example of application output that may be stored within the output partition 60.

Application programs that execute within the supported and unsupported environments may be configured to store output and configuration data within the output partition 60 by making appropriate registry changes to the registry 40 (e.g., by setting an appropriate HKEY value or indication within the registry 40).

In an exemplary embodiment, the location of the "My Documents" folder within a Windows operating environment is changed by a registry edit to be located within the output partition 60, as opposed to within the partitions 54 or 56. It will be appreciated that while the output partition 60 will rarely be an active partition, it is nonetheless visible when either the supported or unsupported partition 54 or 56 is active.

In one exemplary embodiment of the present invention, the operating system and application programs 66 and 68 of the unsupported partition 56 may similarly be configured to save output documents 70 and configuration data 72 to the output partition 60, so that data from both the supported operating environment and unsupported operating environment are stored to the output partition 60. In an alternative embodiment, the output documents 70 and the configuration data 72 generated within the unsupported environment may simply be stored within the unsupported partition 56, again by making appropriate changes to the registry 40.

The present invention also contemplates that the content of the output partition 60 be subject to a backup operation on a periodic basis, or upon the occurrence of a predetermine event. For example, the output partition 60 could be backed up daily, monthly, or upon detecting shut down of the computer system 50. The content of the output partition 60 may, in one exemplary embodiment, be backed-up to a further disk drive included within the computer system 50, an external storage device (e.g., a floppy drive, ZIP® drive or any other removable disk or hard drive medium), or via a network to a remote storage facility. For example, the computer system 50 may establish a connection 80 to the Internet 82 (e.g., a dial up connection or a Digital Subscriber Line (DSL) connection), and then upload the content of the output partition 60 to a remote storage facility maintained by a source provider. The content of the output partition 60 could be uploaded utilizing any one of a number of protocols utilized for communications over the Internet 82, such as for example the File Transfer Protocol (FTP) or the Transmission Control Protocol/Internet Protocol (TCP/IP). To this end, the supported partition 54 and the unsupported partition 56 may include remote backup storage software that performs scheduled backup operations with respect to the content of the output partition 60 on a periodic basis.

The output partition 60 is significant in that it is a further mechanism proposed by the present invention by which the content of the supported partition 54 is protected from modification.

Figure 5:
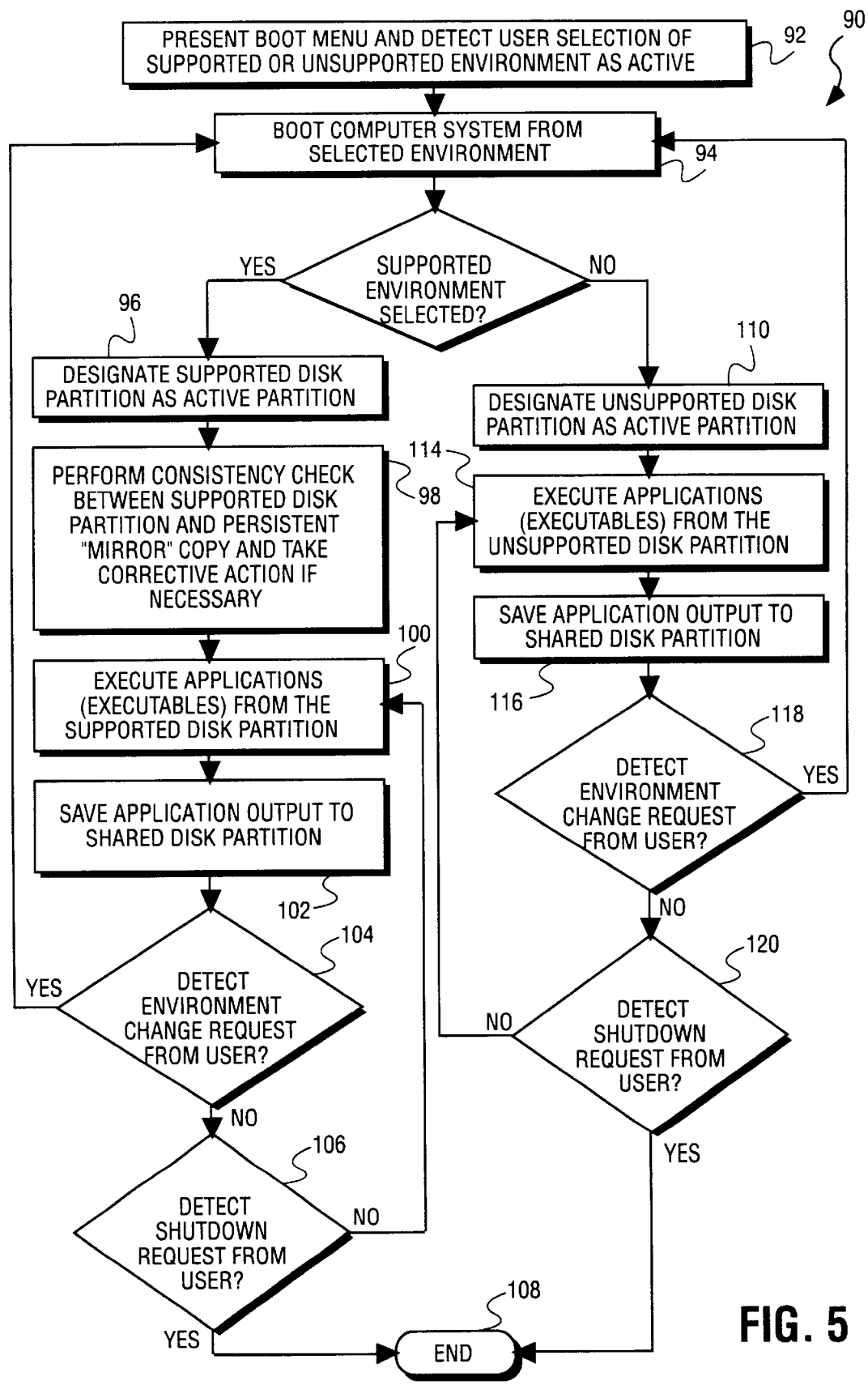
FIG. 5 is a flow chart illustrating a method, according to an exemplary embodiment of the present invention, of operating a computer system configured to implement both supported and unsupported operating environments.

Methodology—Computer System Operation within Supported and Unsupported Environments FIG. 5 is a flow chart illustrating a method 90, according to an exemplary embodiment of the present invention, of operating a computer system configured to implement both supported and unsupported operating environments that may be implemented, in one exemplary embodiment, utilizing the supported partition 54 and the unsupported partition 56 respectively. The method 90 commences at step 92 with the presentation of a boot menu, generated by software within the master boot record 12, that prompts a user to select either the supported or unsupported operating environment for operation of the computer system 50. The user selection is detected and, at step 94, the computer system 50 is booted from the partition supporting the selected operating environment. For example, should the supported environment have been selected, the boot sector 28 of the supported partition 54 is accessed, the appropriate boot code executed, and the appropriate system files 30 loaded and executed.

Should the supported environment be selected, as part of the boot-up process, the method 90 proceeds to step 96 where the supported partition 54 is designated as the active partition. At step 98, a consistency check between the content of the supported partition 54 and the mirror partition 58 is performed, and any corrective action necessary is taken. Further details in this regard are provided below. At step 100, the user may then execute an application program 64, stored within the supported partition 54, within the content of the supported operating environment. At step 102, the application output (e.g., a document 70) and any configuration data 72 is stored to the output partition 60.

At step 104, a user request to change environments may be detected. For example, it may be that the user wishes to install an application on the computer system 50 but is prevented from doing so by the appropriate registry 40 and policy settings within the supported environment. In this case, the user may elect to switch to the unsupported environment, where the user is free to install the application on the unsupported partition 56. If such a user request to change operating environments is detected, the method 90 loops back to step 94, where the computer system 50 is again booted from the unsupported partition 56. On the other hand, should no user request to change operating environment be detected at decision box 104, the method 90 proceeds to decision box 106, where a possible user shut down request is detected. If no such request is detected, the method 90 loops back to step 100, and execution of the applications within the protected environment continues. On the other hand, should a shut down request be detected at decision box 106, the method 90 then terminates at step 108.

Returning to step 94, should the user select to boot into the unsupported environment, utilizing either the boot menu presented at step 92 or by issuing an environment change request at decision box 104, the method 90 proceeds from step 94 to step 110, where the unsupported partition 56 is designated as the active partition. At step 112, an application program 68 stored within the unsupported partition 56 is executed, and output (e.g., document 70) and configuration data 72 pertaining to application program 68 are saved to the output partition 60 (e.g., the "My Documents" folder) at step 116.

Should a user request to change operating environments be detected at decision box 118, the method 90 loops back to step 94; otherwise the method proceeds to decision box 120, where a determination is made as to whether a shut-down request has been received from the user. If not, the method 90 loops back to step 114, where execution of the application program 68 within the unsupported environment continues. Otherwise, the method 90 again terminates at step 108.

The implementation of separate and distinct supported and unsupported operating environments, utilizing separate supported and unsupported partitions 54 and 56, is advantageous from a customer, or technical support viewpoint, in that a support company is enabled to provide support for the supported operating environment in a cost effective manner. Specifically, by configuring the supported environment, via the supported partition 54, to be protected from user modification, and also to be protected from software modification and corruption, the supported operating environment provides a robust operating environment that can be supported at reduced cost. Furthermore, by providing the unsupported operating environment, utilizing the unsupported partition 56, the flexibility of a computer system 50 is not comprised in that a user still has the ability to configure the computer system 50, and install required software, without compromising the integrity of the supported and robust operating environment.

Further, the provision of a persistent copy of a supported partition content, utilizing the mirror partition 58, provides a "self-healing" functionality, in that any modifications to the content of the supported partition 54 can be "undone" by simply replacing the content of this partition 54 with the content of the mirror partition 58. This again enhances the ease with which a technical support company can provide cost effective support for the supported operating environment, in that the need to perform a diagnosis of the supported partition 54 is avoided, and a support operation to correct a system fault or failure requires only that the supported content of the supported partition 54 be restored from the content of the mirror partition 58. Accordingly, the need to perform sophisticated diagnosis is reduced, the need to have sophisticated diagnostic software installed within the computer system 50 is addressed, the need to have a technically skilled person perform the corrective operation is reduced and the time required to perform the corrective operation is also reduced. Furthermore, the corrective operation can be performed remotely, for example using a network communications over a network (e.g., the Internet) by a support service. To this end, a remote support service may establish a network connection to the computer system 50 (e.g., a TCP/IP connection via a dial-up or DSL modem) and communicate with a client application program installed on the computer system to remotely take control of operations of the computer system 50. Examples of programs which allow a remote user to take control of a computer system include the NetMeeting™ application developed by Microsoft Corporation, of Redmond, Wash., or the pcAnywhere™ software developed and sold by Symantec Corporation of Cupertino, Calif. Having established remote control over a computer system 50, the remote support provider may then, by providing a password known only to the remote support provider, obtain access to the registry 40, and access this registry 40 so as to remove the restrictions placed on the supported partition 54. The remote support provider may then, by exercising remote control over the computer system 50, copy the contents of the mirror partition 58 to the supported partition 54 to thereby overwrite the modified contents of the supported partition 54. Again, this may involve simply formatting the supported partition 54 (e.g., using the "format" command) and copying the content of the mirror partition 58 to the formatted supported portion 54 (e.g., using the "copy" command).

Figure 6:
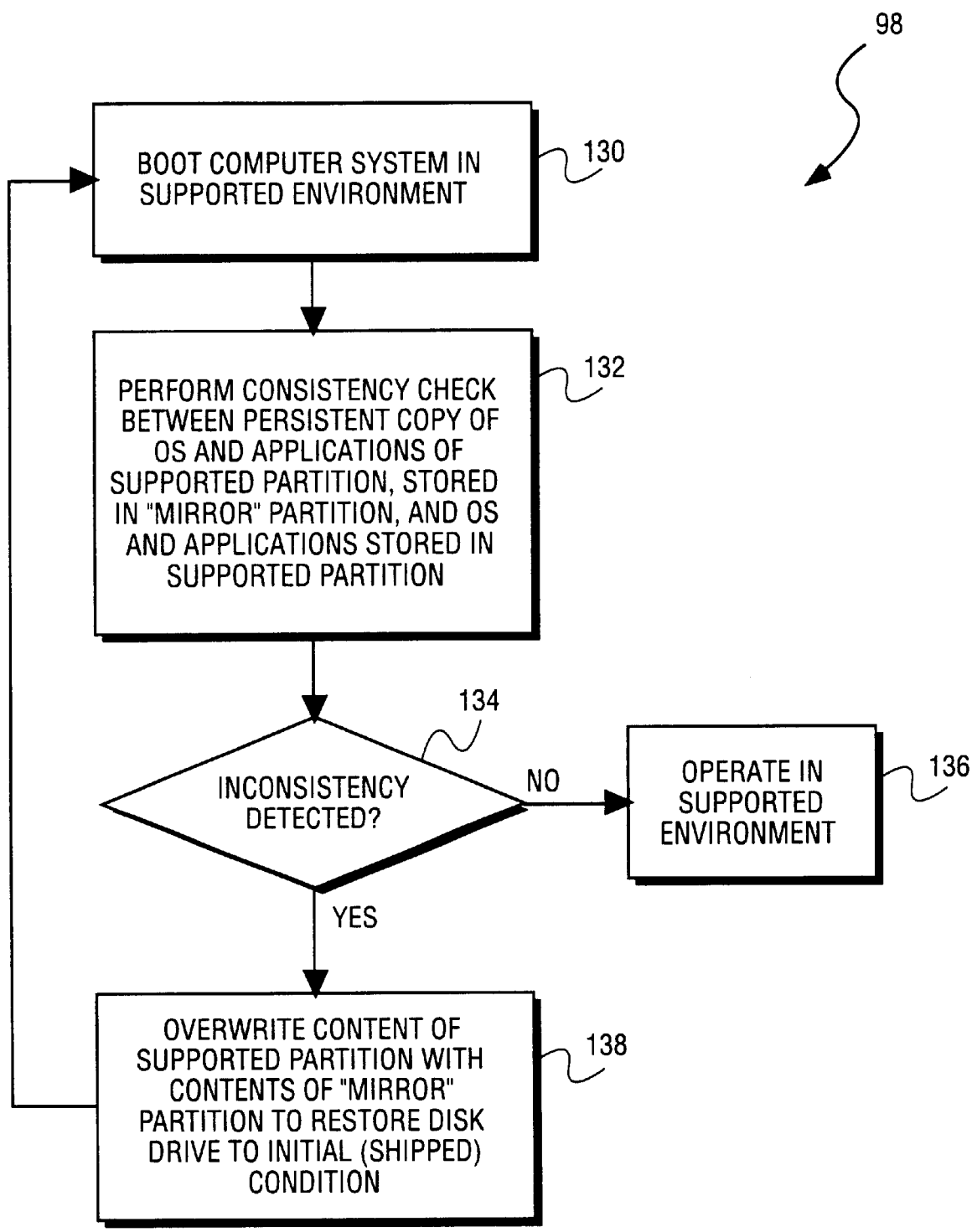
FIG. 6 is a flow chart illustrating a method, according to an exemplary embodiment of the present invention, of restoring the content of a supported partition to a supported, or reference, state.

In a further embodiment of the present invention, instead of having a remote support service take control of the computer system 50 with the purpose of restoring the content of the supported partition 54 from the mirror partition 58, a "self-healing" functionality is implemented, wherein the corrective action referred to above at step 98 in FIG. 5 is performed automatically by software upon the detection of an inconsistency between the content of the supported partition 54 and the mirror partition 58. To this end, reference is made to FIG. 6, which is a flow chart illustrating a method 98, that corresponds to the step 98 shown in FIG. 5 and according to an exemplary embodiment of the present invention, of restoring the content of the supported partition 54 to a supported state (also referred to as a "reference state"). Specifically, the method 98 commences at step 130 when the computer system 50 is booted into the supported environment, implemented from the supported partition 54. At step 132, a consistency check is performed between the content of the mirror partition 58 and the content of the supported partition 54. This consistency check may be performed automatically by code contained in the boot sector 28, or within the system files 30, of the supported partition. In an alternative embodiment, an application program stored within the supported partition 54 may be evoked to perform the consistency check.

At decision box 134, a determination is made as to whether any inconsistencies have been detected. If not, the method 98 proceeds to step 136, where the computer system 50 proceeds to operate within the supported environment. On the other hand, should a consistency be detected at decision box 134, the content of the supported partition 54 is overwritten with the content of the mirror partition 58, so as to restore the "reference state", or original content, to the supported partition 54. The overwriting may be performed by "repair program" stored either within the supported partition 54, or a floppy disk inserted into the computer system or stored on a remote device coupled to the computer system via a network connection.

Methodology—Configuring of a Storage Device Accessed by Computer System

Figure 7:
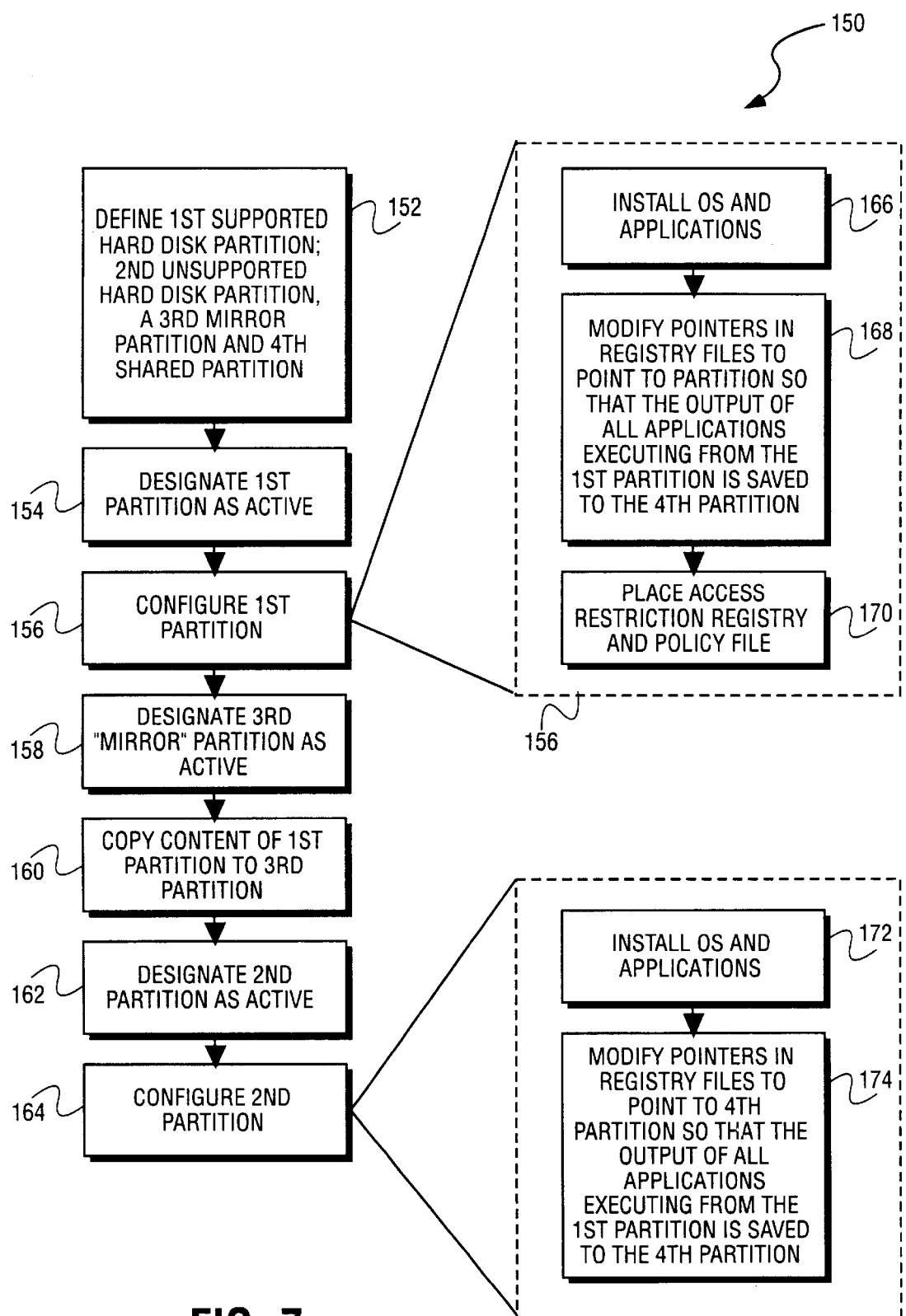
FIG. 7 is a flow chart illustrating a method, according to an exemplary embodiment of the present invention, of configuring a storage device accessible by a computer system to increase the robustness and reliability of the computer system.

FIG. 7 is a flow chart illustrating a method 150, according to an exemplary embodiment of the present invention, of configuring a storage device, for example a hard drive 52, accessible by a computer system 50 so as to increase the robustness and reliability of the computer system 50. The method 150 may, it will be appreciated, be performed by an IT support organization to configure a computer system leased by the support organization to an end user, or to configure a computer system already owned by an end user for which the relevant IT support company is providing technical support. The method 150 may also, in a further embodiment, be performed by a computer system manufacturer that provides warranty protection, either through an in-house technical support service or an outsourced service, prior to supplying a computer system to an end user. Finally, the method 150 could also be implemented by the end user to increase the robustness of an owned or leased computer system 50.

The method 150 commences at step 152 with the definition of the supported, the unsupported, the mirror, and the output partitions 54,56,58 and 60 within a storage device, such as for example the hard drive 52. The definition of these four partitions may be performed in any one of a number of ways. For example, the FDISK program may be utilized. A more sophisticated application, such as Partition Commander™ developed by V Communications, Incorporated of San Jose, Calif., may be utilized to perform the partitioning.

At step 154, the supported partition 54 is designated as active. This designation may be as a result of a choice made by a configurer responsive to a boot menu presented by boot manager code incorporated within the MBR 12. Alternatively, the computer system 50 may be configured to recognize the supported partition 54 as a default active partition and, on boot-up of the computer system 50, the supported partition will automatically be designated as the active partition. At step 154, supported partition 54 is configured according to the teachings of the present invention. Specifically, at step 166, an operating system 62 and selected application program 64 are installed within the supported partition 54. The operating system 62 and application program 64 may be selected based on a anticipated use for the computer (e.g., a home user or a business user). Furthermore, the application programs 64 installed may be selected based on a more specific anticipated business use. For example, a computer system 50 for use in law offices would have a first bundle of application programs 64 installed thereon, whereas a computer system 50 destined for use by an accountant may have an alternative bundle of application programs 64 installed thereon.

At step 168, pointers within the registry 40 for the supported partition are modified to point to the output partition 60. Specifically, these modifications to the registry 40 will cause the application program 64 to save all documents 70 and configuration data 72, that are by necessity modifiable by a user or software, automatically and seamlessly to the output partition 60, thus preserving the unmodified state of the supported partition.

Figure 8A:
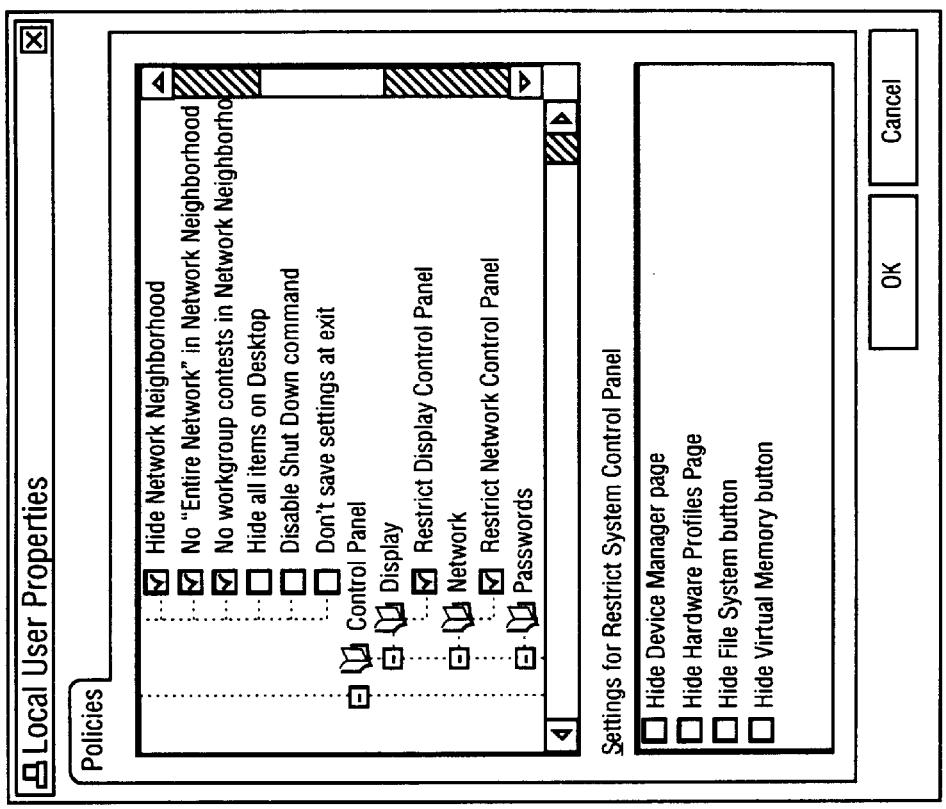
FIGS. 8A–8C show a sequence of screen shots illustrating how a System Policy Editor application may be utilized to modify a policy file of a supported partition, according to an exemplary embodiment of the present invention.
Figure 8B:
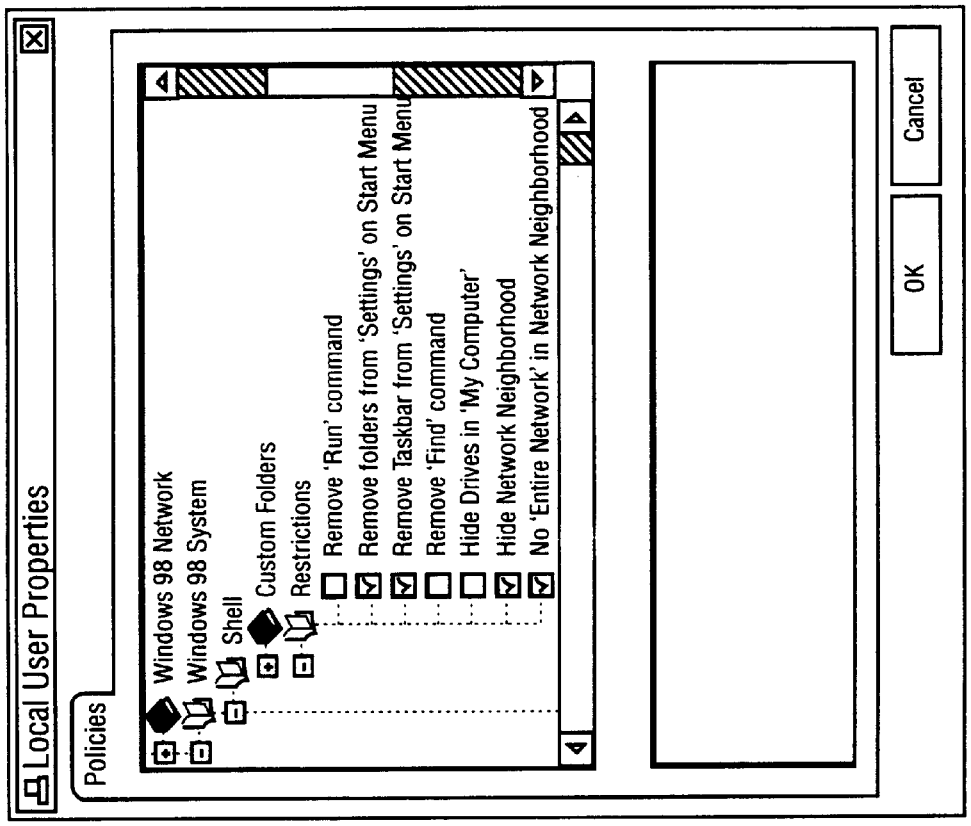
Figure 8C:
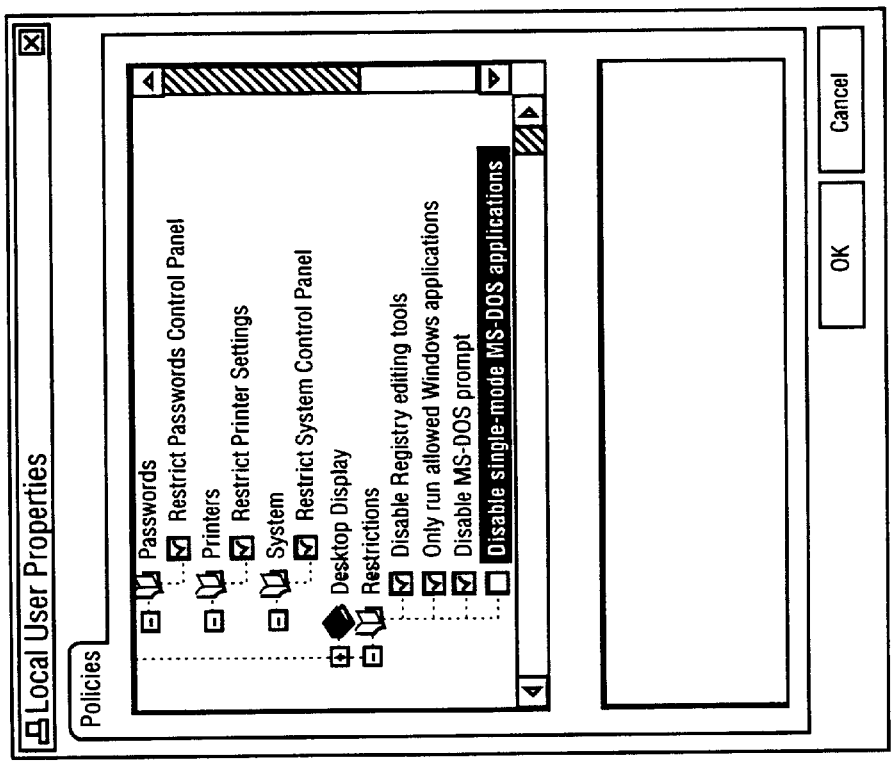

At step 170, the configurer then places access restrictions on the registry 40 and the policy file 41 for the supported partition 54. To this end, FIGS. 8A–8C show a sequence of screen shots illustrating how a System Policy Editor application may be utilized to modify a policy file 41 for the supported partition 54. FIGS. 9A–9D illustrate how the registry editor 46 may be utilized to modify the registry 40 of the supported partition 54 to implement the access restrictions. It will be appreciated that the various restrictions shown to be implemented in FIGS. 8A–8C and 9A–9D are merely exemplary and the restrictions on the user access could be implemented in a number of other ways. Furthermore, the provided examples are specific to the Windows 95/98/NT operating systems, and it will be appreciated that other operating systems (e.g., Unix-operating system, the Macintosh operating system, and the OS/2 operating system) would inherently require that the restrictions be applied in an alternative manner.

Returning to FIG. 8A, it will be seen that the policy editor is utilized to hide a "Network Neighborhood" icon, and the content of a window that is usually generated responsive to a selection of the "Network Neighborhood" icon. Furthermore, restrictions are placed on the "Display Control" panel and the "Network Control" panel.

FIG. 8B illustrates the removal of the folders and the task bar from the "settings" selection presented by the Windows Start Menu.

FIG. 8C illustrates the placing of restrictions on the "Passwords Control" panel, printer settings and the "System Control" panel. Restrictions are also shown to include the disablement of registry editing tools, the disablement of the MS-DOS prompt, and the disablement of any applications other than predetermined "allowed" applications. Specifically, the registry 40 maintains a list of allowed executables (e.g., winword.exe or notepad.exe) that may be edited.

Figure 9A:
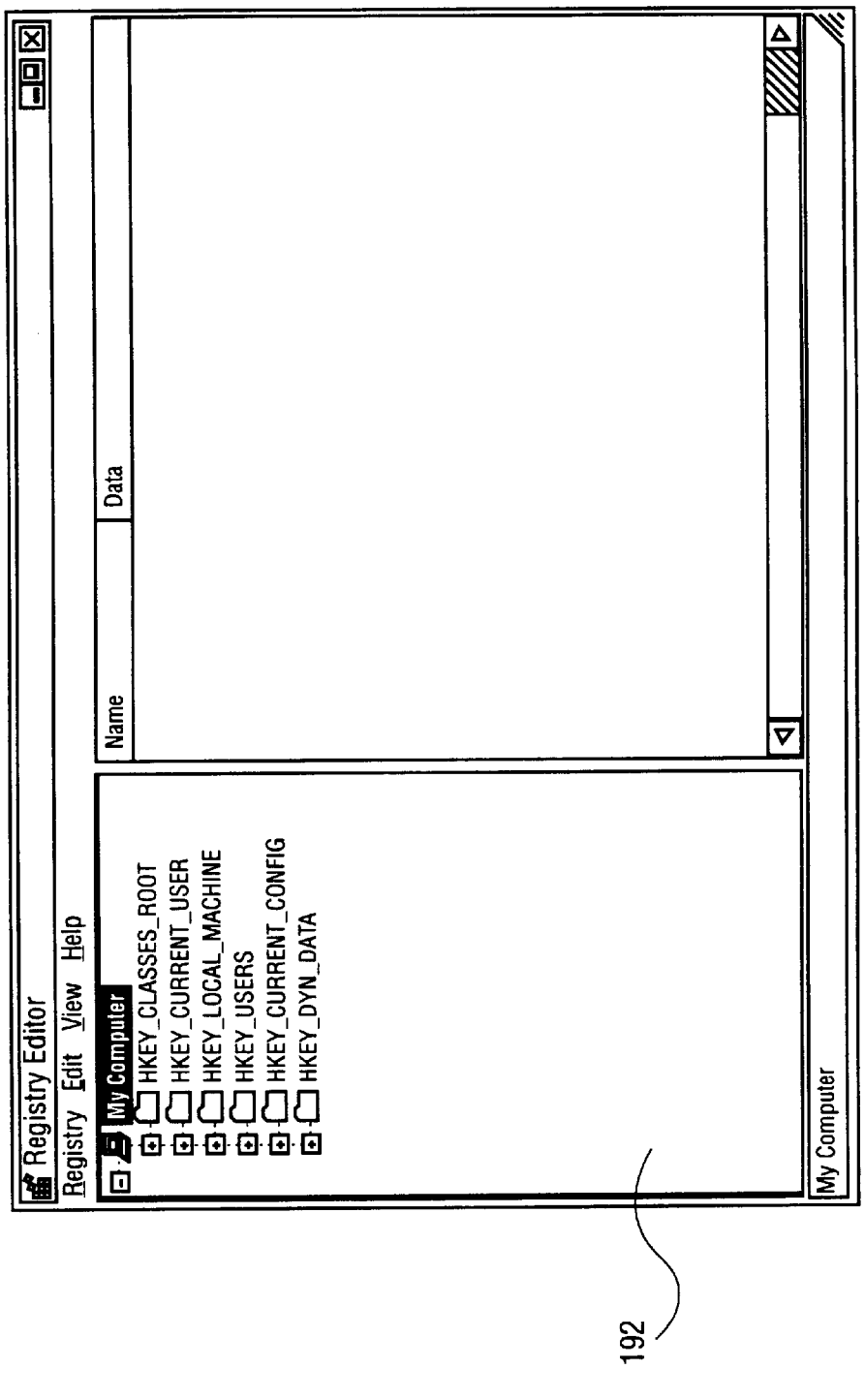
FIGS. 9A–9D illustrate a sequence of screen shots showing how a registry editor may be utilized to modify a registry of a supported partition to implement access restrictions, according to an exemplary embodiment of the present invention.
Figure 9B:
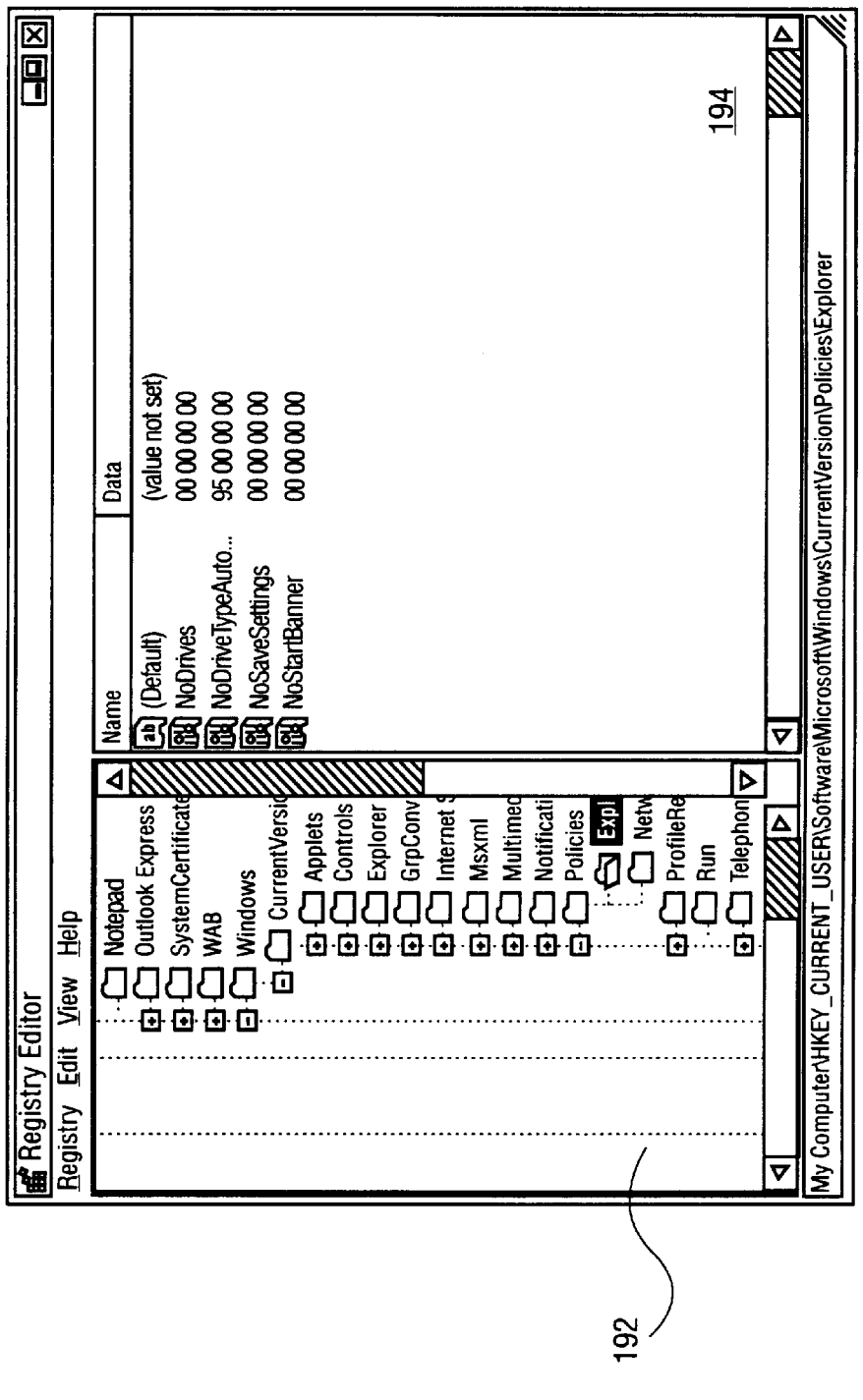

FIG. 9A shows a window 190 presented by the registry editor 46, within which the six "keys" of the registry 40 are represented by respective folders within the left hand side panel 192. Following user selection of the following path:

HKEY_CURRENT_USER/SOFTWARE/ MICROSOFT/WINDOWS/CURRENTVERSION/ POLICIES/EXPLORER, utilizing the left hand side panel, the window 190 will appear as it is shown in FIG. 9B. Moving across to the right hand side panel 194 of the window 190, the "NoDrives" icon is then user-selected and deleted.

Figure 9C:
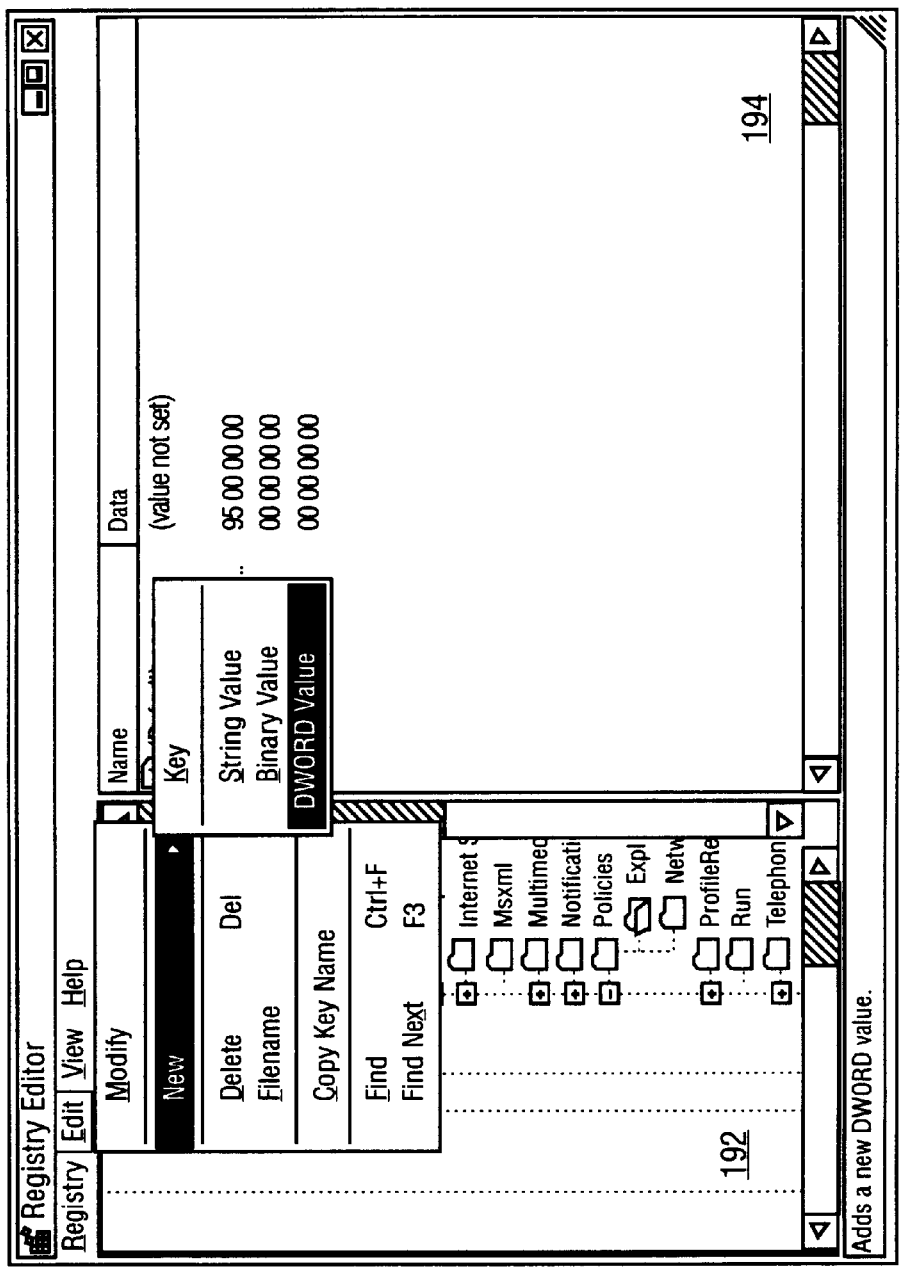

Turning to FIG. 9C, the "new option" is then selected from the "Edit" drop down menu and the "DWORD value" item is selected from the menu generated responsive to the selection of the "new" item.

Figure 9D:
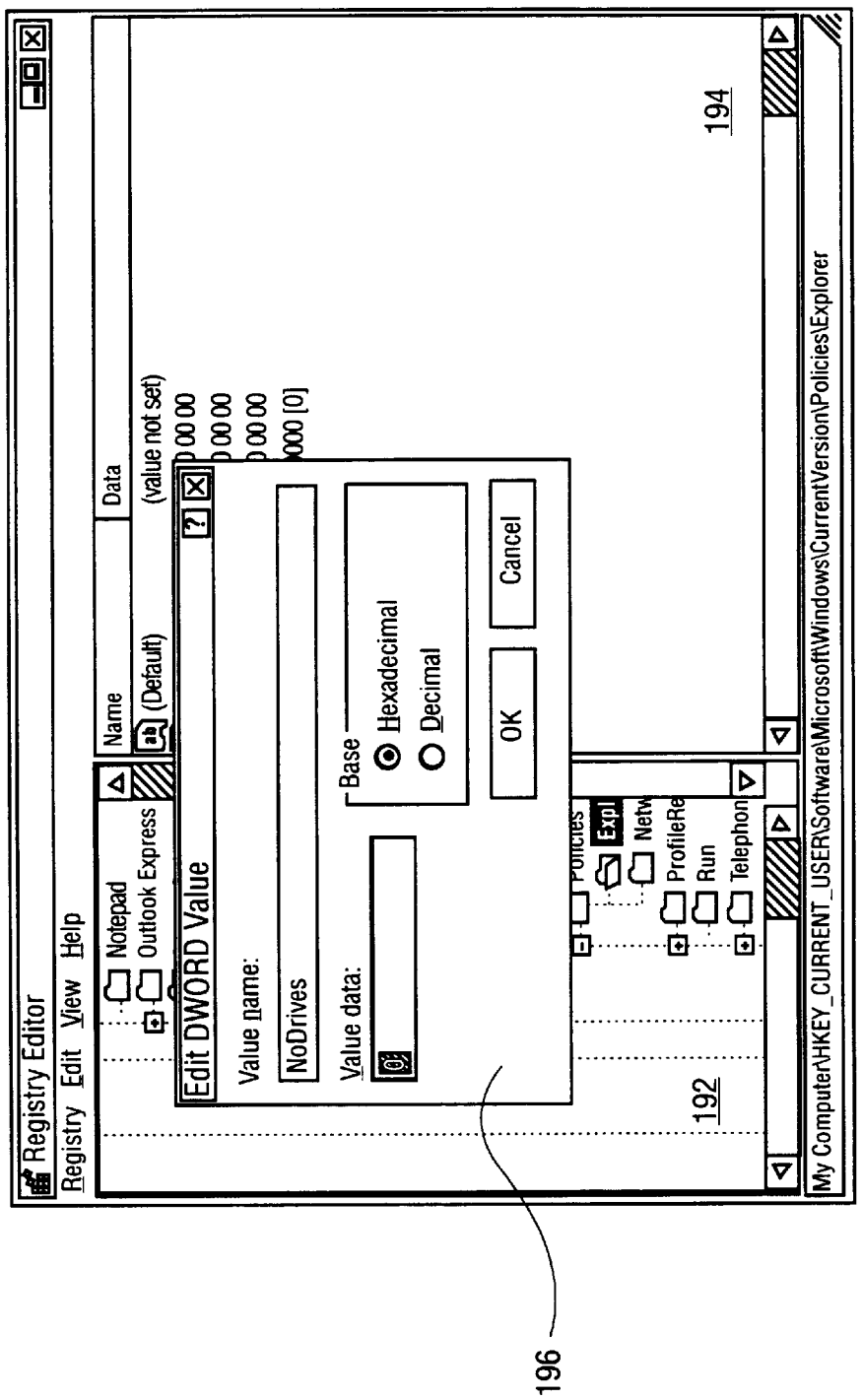

FIG. 9D shows an "Edit DWORD value" dialog box 196 that is then presented, utilizing which the configurer can create a new "NoDrives" item having a hexadecimal value of 416. Having created such a new "NoDrives" item, the registry editor 46 is exited, and the computer system 50 restarted.

Returning to FIG. 7, following configuration of the first partition at step 156, for example in the manner described above, at step 158 the mirror partition is designated as active. At step 160, the configured content of the supported partition 54 is copied to the mirror partition 58 to capture a "snapshot" of the original supported content of the supported partition 54 (i.e., the "reference state").

At step 162, the unsupported partition 56 is designated as active, for example upon reboot of the computer system 50 and utilizing a boot menu presented by a boot manager program, whereafter the unsupported partition 56 is configured at step 164. The configuration of the unsupported partition 56 is shown to involve the installation of an operating system 66, which may or may not be the same operating system as that installed on the supported partition 54, and application programs 68. At step 174, the pointers in the registry 40 for the unsupported partition 56 are modified, as described above with reference to step 168, so that the output, and configuration data 72, for applications of the unsupported partition 56 are saved within the output partition 60.

Having both the supported partition 54 and the unsupported partition 56 save output and configuration information to the output partition 60 is advantageous in that it provides a single, unified location at which output data, configuration data, and other modifiable data can be saved. This single location (e.g., the output partition 60) can then conveniently be backed-up, for example, to a remote location in the manner described above.

Methodology—The Provision of Technical Support for a Computer System

Figure 10:
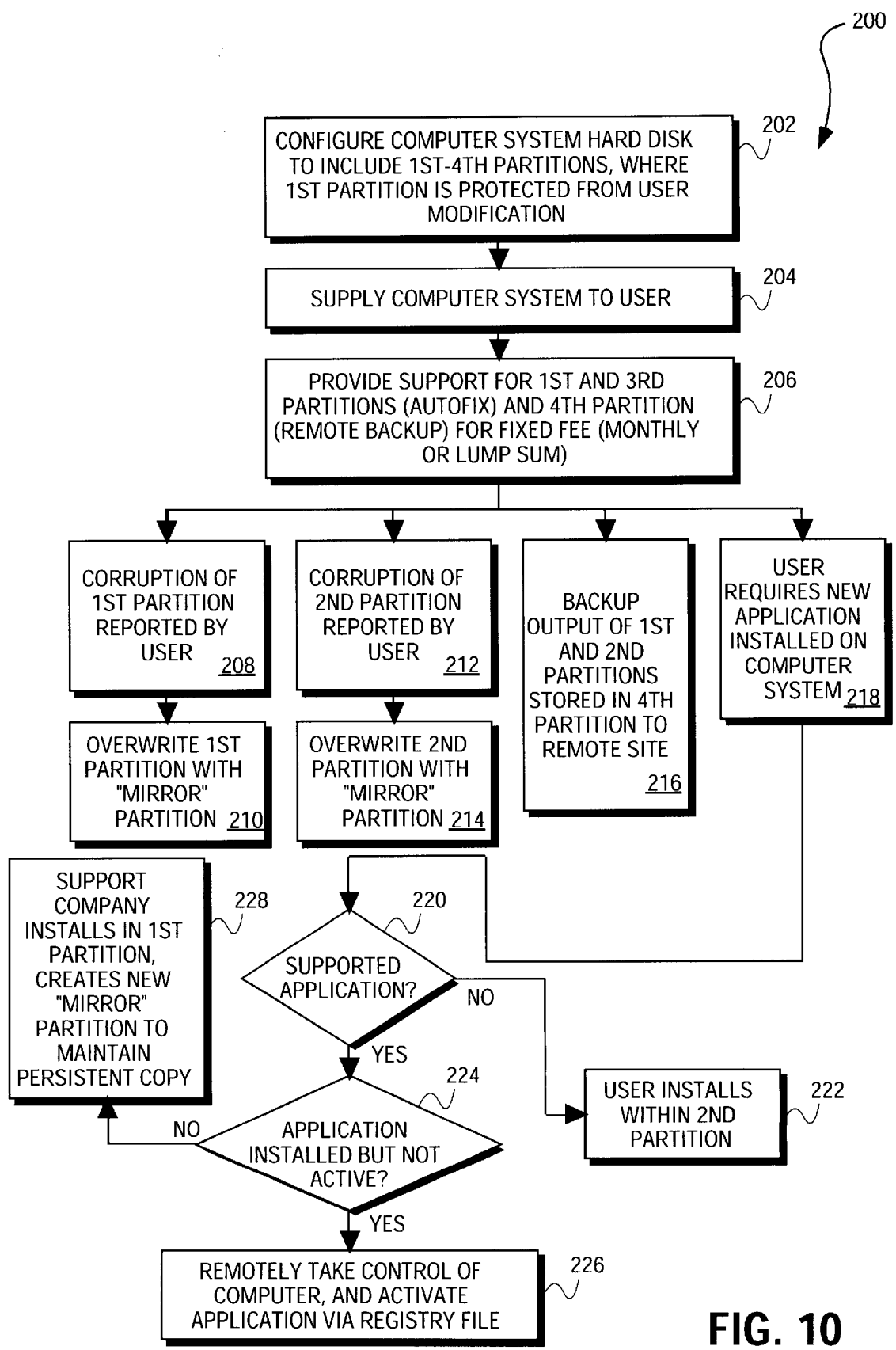
FIG. 10 is a flow chart illustrating a method, according to an exemplary embodiment of the present invention, of providing support for a computer system.

FIG. 10 is a flow chart illustrating a method 200, according to an exemplary embodiment of the present invention, of providing support for a computer system 50. The method 200 may be implemented by a technical support provider, which may constitute an independent organization or may be part of a support structure of a computer system manufacturer.

The method 200 commences with the configuration of a storage device, in the exemplary form of a hard drive 52, to include the four partitions 54, 56, 58 and 60 described above, with the supported partition 54 being protected from user modification. The protection mechanisms that provide this protection are discussed above.

At step 204, a computer system is supplied to an end user (e.g., an individual, business concern or organization) by either a computer manufacturer or by a leasing service that leases the computer system to the end user. For example, an end user may outright buy the computer system 50 and an associated warranty from a support service, or may lease the computer system 50 from a supply organization that provides the technical support as part of the leasing service.

At step 206, a support service provides support for the supported partition 54, and the mirror partition 58 and the output partition 60 under a predetermined compensation scheme. In one embodiment of the present invention where the computer system is leased, the computer system and the support provided at step 206 may be provided for a fixed monthly fee, or other periodic fee, or a one-time lump sum payment. In an alternative embodiment of the present invention where the end user buys the computer system 50 outright, the support may be provided under a compensation scheme for a lesser charge than if the computer system 50 were leased. The support provided at step 206 includes a number of components, examples of which are shown to follow on from the step 206.

Turning first to a first support function provided under the method 200, if corruption from a modification, or any other fault, pertaining to the supported partition 54 is detected (e.g., automatically or by the user) at step 208, the provision of support may constitute an overwrite operation of the supported partition 54 with the content of the mirror partition 58 so as to restore the reference state to the supported partition 54. Steps 208 and 210 may manually be performed by a user on-site, may manually be performed by a support service either on-site or remotely via a network connection, or may be fully automated utilizing software installed on the computer system 50 of the end user.

A second support function commences at step 212 with the detection of corruption resulting from a modification or a fault pertaining to the unsupported partition. Again, step 212 may be manually performed by a user, manually performed by a support service or automatically detected by software. Responsive to step 212, at step 214, the content of the unsupported partition 56 is overwritten with the content of the mirror partition 58, so as to restore the content of the second partition to an original state, that corresponds to the original state of the supported partition 54. While, as stated above, an end user is free to install application and data within the unsupported partition 56, the method 200 proposes restoring the content of the unsupported partition 56 to a known state that is not corrupted and does not contain any faults upon the occurrence of a fault pertaining to the unsupported partition 56. Under this remedy, the user may loose any data or applications installed in the unsupported partition 56 subsequent to the initial installation. However, as the correction operations proposed by steps 208, 210, 212 and 214 requires reduced technical expertise and time expenditure, the compensation scheme under which support is provided at step 206 may be favorable to the end user, and the support may be provided at a relatively reduced cost.

A third support function is provided at step 216, with the content of the output partition 60 (i.e., output and configuration data from the supported and unsupported partitions 54 and 56) being backed up, either locally or remotely, in an automated fashion. In one embodiment, the computer system 50 is configured to automatically establish a dial-up connection to a support service on a periodic basis, and to backup the contents of the output partition 60 to storage facilities provided by the support service by the dial-up connection. In a further embodiment, the computer system 50 may have a permanent connection to the network, for example the Internet via a DSL or ISDN connection, and remote backup software may be configured periodically to perform backup to storage facilities provided by a supported service.

A fourth aspect of the support service commences at step 218, with a user request that a new application, or other software component, be installed upon the supported computer system 50. For example, the user may become aware of a new application program that was not previously installed, an update to an installed application, or an update to the installed operating system stored within the supported partition 54. At step 220, the support service makes a determination as to whether the relevant application or other software component is supported. If not, the user is then advised to install the application or software component within the unsupported partition 56, with the understanding that no technical support for this application is provided and should the second partition become corrupted or experience a failure, only corrective actions described above at steps 212 and 214 may be executed, wherein the content of the unsupported partition 56 is restored to an original state. In this case, the newly installed application would, it will be appreciated, be lost.

On the other hand, should it be determined at decision box 220 that the desired application, or software component, is in fact supported, a further determination is then made by the support service at step 224 as to whether the relevant application, or software component, is already installed within the supported partition 54 but not activated. This determination may be made by referencing an installation record maintained by the support service, by referencing a copy of the supported partition 54 maintained by the support service at support service site, or by referencing the actual supported partition 54 of the computer system 50 utilizing a remote connection. The application may be installed, but not activated, by the state of various settings within the registry 40 and the policy file 41. For example, a specific word processor application may be installed, but not be readily accessible and invokable by a user. For example, the registry 40 may be specified such that the launch icon for the relevant word processor is not displayed on the desktop, or on any other menus, presented by the operating system installed on the computer system 50. Accordingly, for the terms of the present specification, an "inactive application" shall be defined as any application to which user access is restricted and that is not readily invokable by a user in a manner appropriate for the operating system installed on a computer system 50.

Should it be determined at decision box 224 that the desired application is in fact installed, but inactive, within the supported partition 54, the support service at step 226 remotely takes control of the computer system 50 and activates the installed application by making appropriate edits to the registry 40 of the supported partition 54. To this end, the support service may have a password that enables the support service to bypass the restrictions placed on edits to the registry 40 and to disable the restrictions on the registry 40. Having access to the registry 40, the support service may then modify settings to make the desired application available, readily executable, and easily launched in a conventional manner on the computer system 50. In an exemplary embodiment, the "activation" of the desired application involves the restoration of launch icons to the desktop and/or appropriate menus presented by the operating system 62 and the designation of the application as an "allowed application" within the registry 40.

On the other hand, should it be determined that the desired application is in fact not installed within the supported partition 54, the method 200 proceeds to step 228 where the support company installs the application within the supported partition 54, updates the contents of the mirror partition 58 to conform to the new supported partition, and accordingly defines a new "reference" state (or supported state) for the supported partition 54. This updating of the supported partition 54 may be done remotely and with respect to a computer system 50 that is already in possession of the end user. Alternatively, the support service may configure a new computer system 50 to include a supported partition 54 having the content desired by the end user, and then replace the computer system 50 that is in possession of the end user with a newly configured computer system 50. For example, the support service may arrange for the delivery of the newly configured computer system 50 to a location specified by the end user, and collect the "old" computer system for return to the support service. The support service may then optionally reconfigure the returned "old" computer system 50, which may then be supplied to a further customer if and when required.

Methodology—Supply of Pre-Configured Computer System to End User

Figure 11:
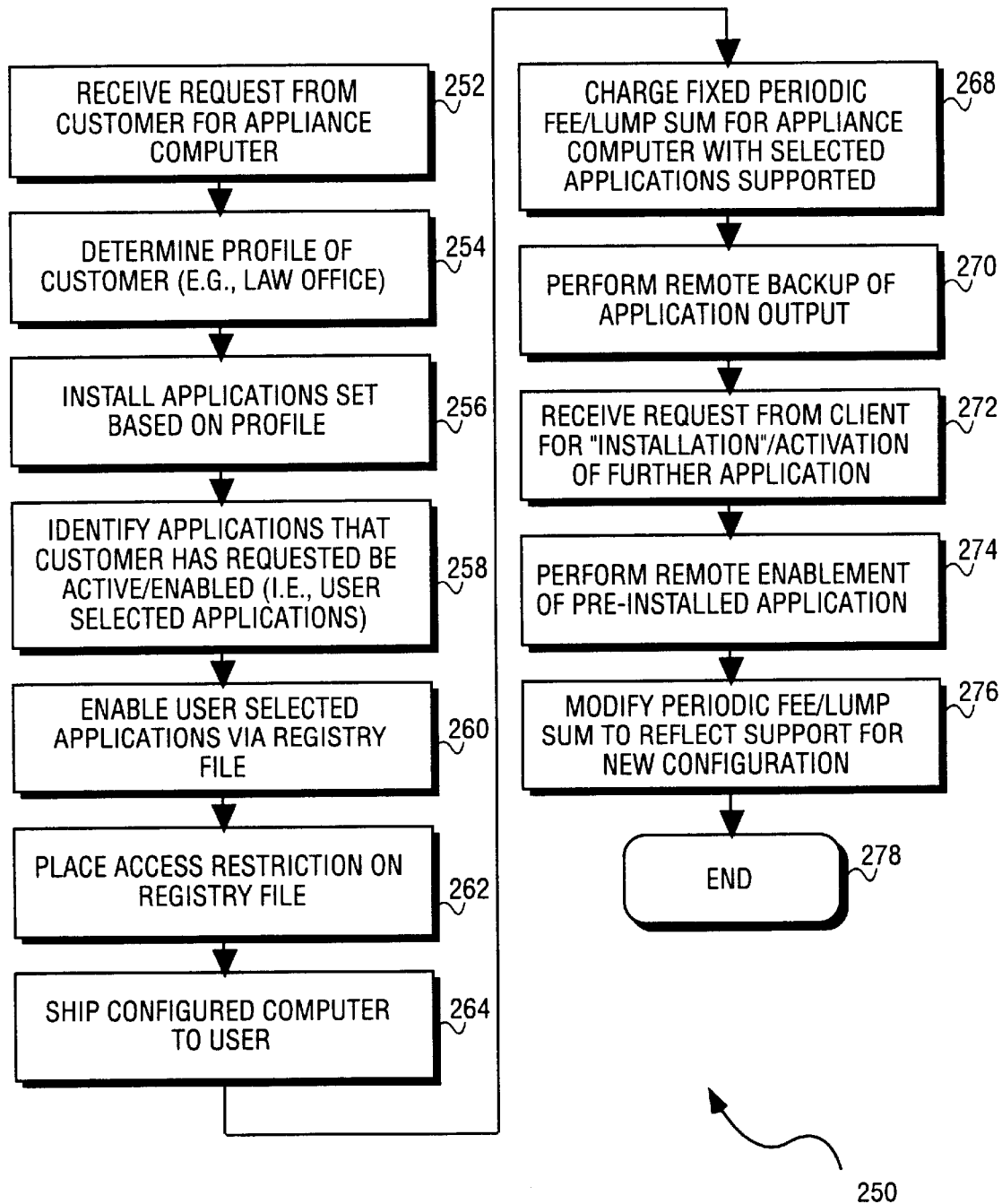
FIG. 11 is a flow chart illustrating a method, according to an exemplary embodiment, of supplying a preconfigured computer system to an end user.

A method 250, according to an exemplary embodiment of the present invention, of supplying a pre-configured computer system to an end user will now be described with reference to FIGS. 11–13. The present invention contemplates that a user may request a computer system 50 for a specific use or environment, and that a computer system 50 configured for that environment is supplied to the end user. Specifically, the computer system 50 is configured with a library of applications, a subset of which may be enabled, or "active", based on a user profile, user request and/or a payment scheme selected by the user. The user then has the option of modifying the configuration (e.g., which applications are enabled or "allowed") and the configuration changes requested by the user are then implemented by a support service, in one exemplary embodiment, in a remote manner.

The method 250 commences at step 252 with the receipt of a request from a customer for an "appliance" computer system 50. For example, where the client is a law practice, a request may be made for a "law appliance" computer system 50 that is configured for use by a lawyer and within a law practice environment. The request may be made to a computer manufacturer or, reseller concern, or leasing concern, and may be a request for an outright purchase of the computer system or to lease (or rent) the computer system 50. The request may be received telephonically, by e-mail, or via a web interface operated by the computer manufacturer, reseller or leasing concern.

At step 254, the profile of the customer is determined. This could be determined from existing records maintained by the supplier, from information provided in the request at step 252, or utilizing any other resources. For example, where the customer is a law practice, this information may be communicated in the request at step 252.

At step 256, a library of application programs is installed on the supported partition 54, the content of the library, in one exemplary embodiment, being determined based on the profile of the customer or the intended use of the computer system 50.

At step 258, specific application programs within the library of application programs 64 are identified as "allowable" applications, in that the selected applications are executable by an end user. The identification of which application programs within the library to activate may be made utilizing a number of criteria. Firstly, a user may specify that certain application programs are required. Secondly, a user may have specified a certain leasing or subscription scheme, in terms of which certain application programs are enabled. For example, a limited set of application programs may be enabled for a first lower subscription fee, whereas an expanded set of applications may be enabled for an increased subscription fee.

At step 260, the selected application programs 64 are enabled via the registry 40, in the manner described above, to thereby configure the supported partition 54.

At step 262, access restrictions are placed on the registry 40 in the manner described above. At step 264, the configured computer system 50 is then supplied to the user.

At step 268, a compensation scheme, or subscription scheme, is implemented whereby the end user compensates the supplier of the computer system for a number of items in terms of a supplier agreement. For example, the end user may have purchased a computer system outright, and may pay a monthly subscription fee for only various applications installed on the computer system as well as for technical support on a month to month basis. Alternatively, the end user may pay a periodic lease and subscription fee to the provider for the lease (or rental) of the computer equipment, the applications installed thereon, and technical support for both the computer system hardware and the installed application software. In a further embodiment, the end user may pay an up-front lump-sum payment for the computer hardware and/or the applications, and pay a reduced subscription fee for technical support with respect to the computer system and installed software. It will be appreciated that various permutations and combinations of the above-described schemes may be implemented in performance of the step 268.

At step 270, a back-up support function, as describe above with respect to step 216, is performed at step 270. This may take the form of an automated or manual local back-up operation, or an automated or manual remote backup operation performed to a storage location operated by the supplier.

At step 272, a request is received by the supplier from the client for the installation, or activation, of a further application. This request may be in the form of an e-mail communication, a telephone call or a communication via a web-based interface.

At step 274, the pre-installed application, which was previously deactivated or disabled, is then activated or enabled. In one exemplary embodiment, this may be performed remotely by the supplier by establishing a network connection (e.g., via the Internet) in a computer system operated by the supplier and the computer system of the end user. In an alternative embodiment, the activation or enablement of the preinstalled, but disabled, application program may be performed manually by dispatching a representative of the support service to a customer location, where the activation operation is performed by the service representative. In yet a further embodiment, the end user may themselves be instructed, for example via the telephone or e-mailed instructions, as to the steps required to enable the preinstalled application. In this case, the end user may be given a "use-once", or time-limited, password that enables them to enable specific applications but prevents the enablement of other applications.

At step 276, the service provider modifies the compensation scheme determined at step 268 to reflect the modified configuration of the supported partition 54. For example, a subscription fee may be increased to reflect that the end user now has an additional application program, or application programs, enabled on the computer system 50. The method 250 then terminates at step 278.

Figure 12:
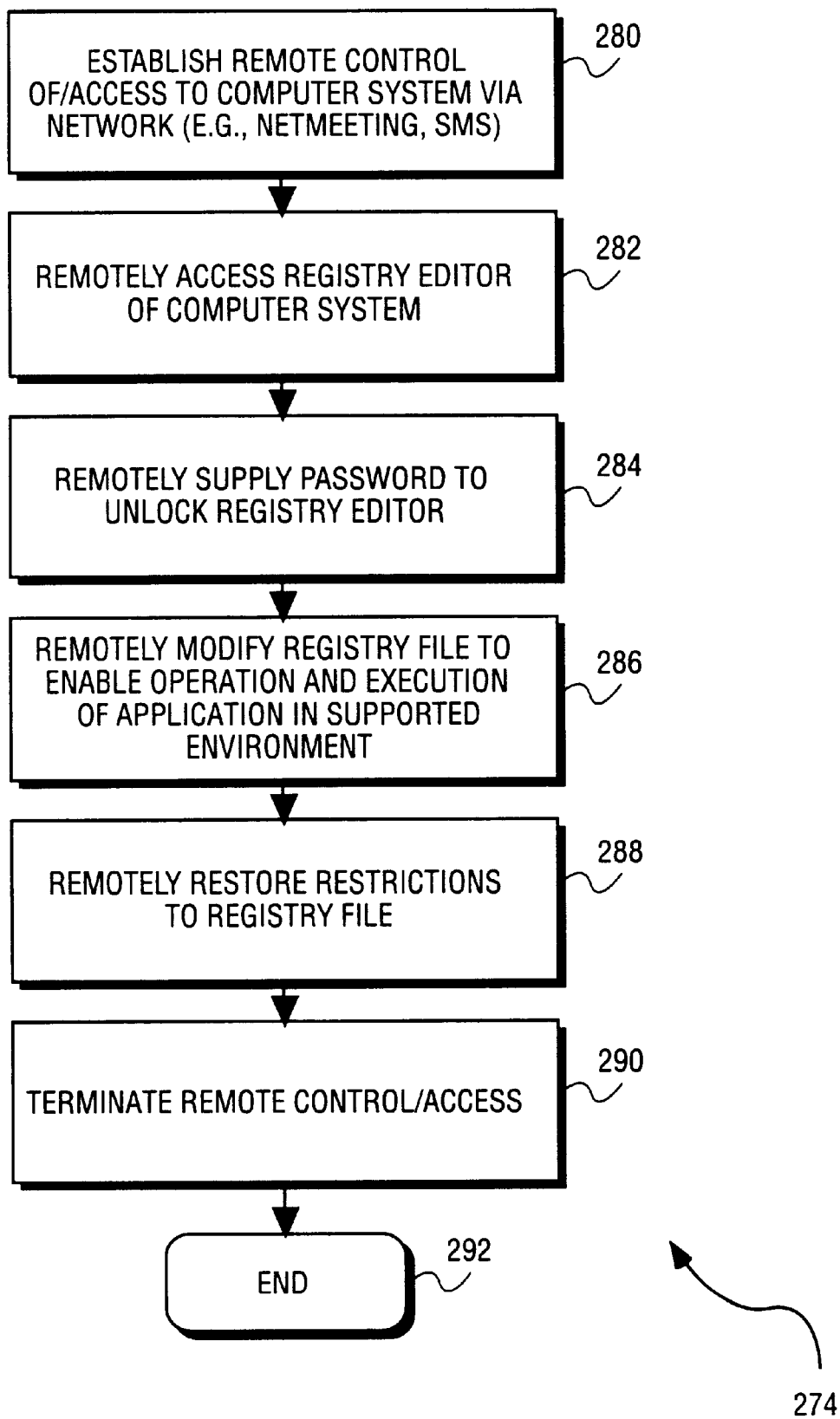
FIG. 12 is a flow chart illustrating a method, according to an exemplary embodiment of the present invention, of enabling or activating a preinstalled application that was previously deactivated or disabled.
Figure 13:
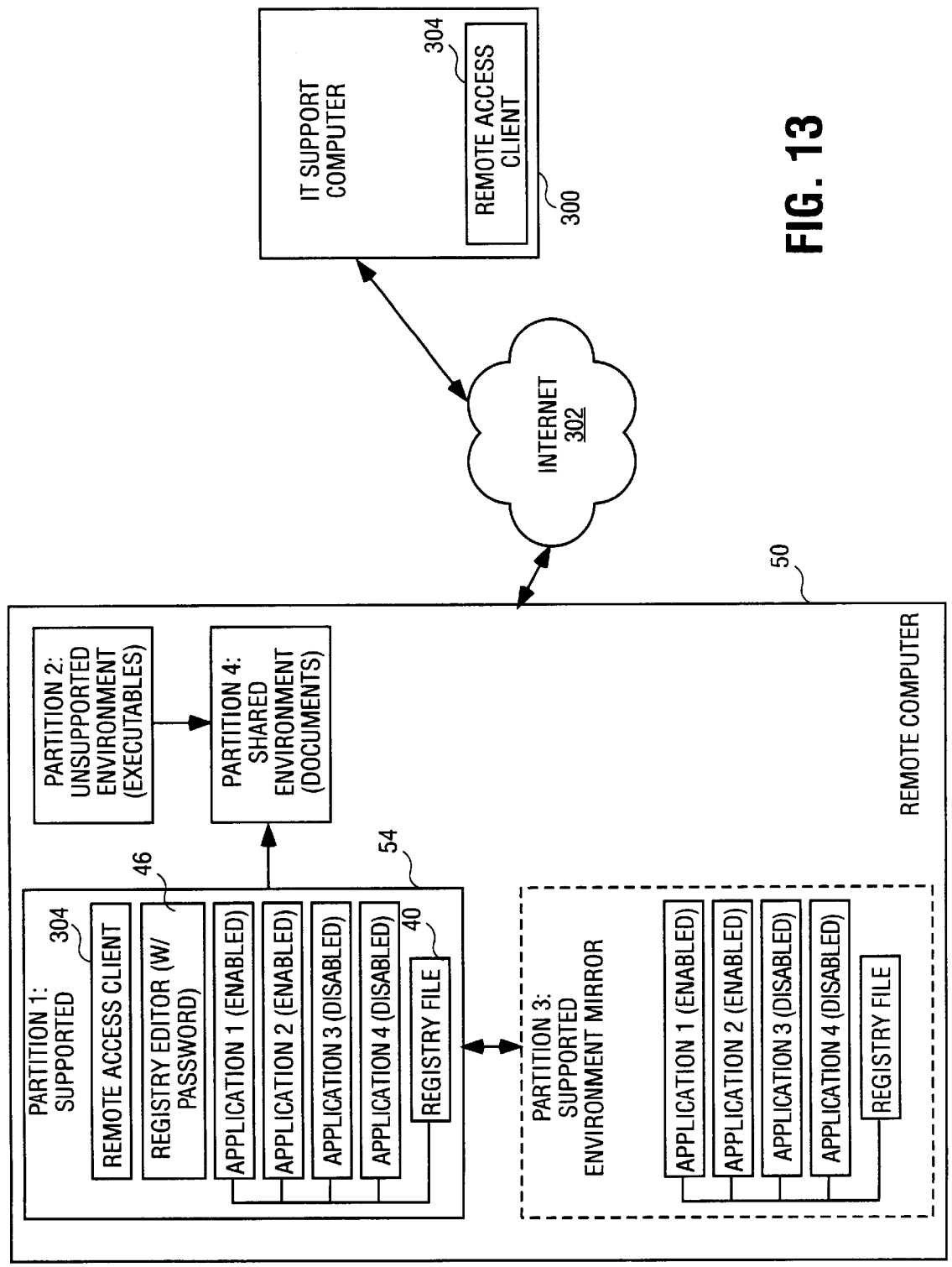
FIG. 13 is a block diagram illustrating an exemplary embodiment of a remote computer with a supported partition having a specific configuration, and a support computer that is capable of remotely accessing the remote computer system via a network to modify this specific configuration.

Figure 12 is a flow chart illustrating steps, according to an exemplary embodiment of the present invention, that may be performed in the implementation of step 274 described above with reference to FIG. 11. Specifically, FIG. 12 details the steps that may, according to an exemplary embodiment of the present invention, be performed remotely to enable a pre-installed, but disabled or inactive, application program 64 installed within the supported partition 54 of the computer system 50. The steps illustrated in FIG. 12 will be described with reference to FIG. 13, which is a block diagram illustrating an exemplary embodiment of a remote computer 50 with a supported partition 54 having a specific configuration and a support computer 300 that is capable of remotely accessing the computer system 50 by a network, such as for example the Internet 302. To facilitate this remote access, the computer system 50 and the support computer 300 have remote access clients 304 installed thereon that enable the support computer 300 to take control of, or at least access, the computer system 50 for the purposes of modifying the configuration of the supported partition 54. In one exemplary embodiment, the remote access clients 304 may comprise NetMeeting™ client programs, developed by Microsoft Corporation. In an alternative embodiment, the remote access client 304 may comprise the pcAnywhere™ software, developed by Symantec Corporation.

Returning to FIG. 13, at step 280, the support computer 300 establishes remote control of, or at least access to, the computer system 50 via a network, for example the Internet 302. In this way, a support technician operating the support computer 300 is, at step 282, able remotely to access a registry editor 46 installed within the supported partition 54.

At step 284, the service technician, via the support computer 300 on the network 302, supplies a unique password to "unlock" the registry editor 46, and to disable the restrictions placed on the registry editor during an initial configuration of the supported partition 54. Having thus supplied the password, the service technician is, at step 286, able remotely to modify the registry 40 to enable launch, operation and execution of a pre-installed, but previously disabled or inactive, application program installed on the supported partition 54. As mentioned above, this may involve the removal of various restrictions implemented via the registry 40 and via the policy file 41. For example, the selected application may be designated as an "allowed" application, in which case the restrictions implemented by the registry 40 will no longer be applicable. Furthermore, icons via which a user may conveniently launch the relevant application may be restored to appropriate menus presented by the operating system 62 for the supported partition 54.

At step 288, the service technician may then restore restrictions imposed by the registry 40 applicable to the registry 40 itself, and to other applications that are not to be enabled or activated. At step 290, the service technician, via the support computer 300, then terminates the remote control of, or access to, the remote computer 50. The methodology then terminates at step 292.

Computer System

Figure 14:
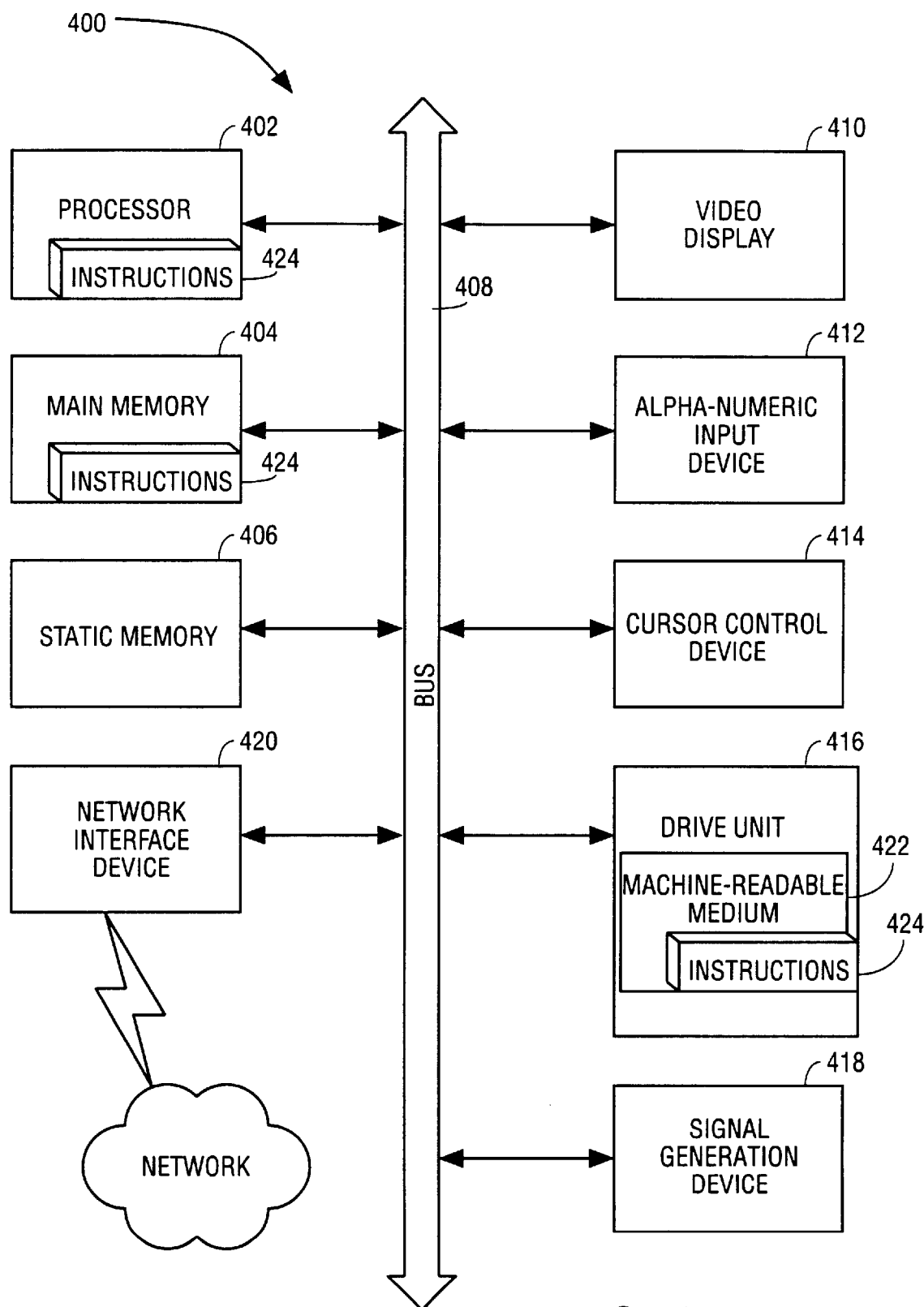
FIG. 14 is a block diagram illustrating a machine, in the exemplary form of a computer system, within which a set of instructions for causing a computer system to perform any of the methodologies discussed in the present specification may be executed.

FIG. 14 is a block diagram illustrating a machine, in the exemplary form of a computer system 400, within which a set of instructions for causing the computer system 400 to perform any one of the methodologies discussed above may be executed. The computer system 400 includes a processor 402, a main memory 404, and a static memory 406, which communicate with each other via a bus 408. The computer system 400 further includes a video display unit 410 (e.g., a liquid crystal display (LCD) or a cathode ray tube (CTR)). The computer system 400 further includes an alpha-numeric input device 412 (e.g., a keyboard), a cursor control device 414 (e.g., a mouse), a storage medium in the exemplary form of a disk drive unit 416, a signal generation device 418 (e.g., a speaker) and a network interface device 420.

The disk drive unit 416 includes a machine-readable medium 422 on which is stored a set of instructions (i.e., software 424) embodying any one, or all, of the methodologies described above. The software 424 is also shown to reside, completely or at least partially, within the main memory 404 and/or within the processor 402. The software 424 may furthermore be transmitted or received via the network interface device 420. For the purposes of the present specification, the term "machine-readable medium" shall be taken to include any medium that is capable of storing and encoding a sequence of instructions for execution by the machine, and that causes the machine to perform any one of the methodologies of the present invention. The term "machine-readable medium" shall accordingly be taken to include, but not limited to, solid-state memories, optical and magnetic disks, and carrier wave signals.

Thus, a method of supplying a computer system to a user, and a method and apparatus for configuring a computer system for supply to a user, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing a computer system to a user, the method comprising:

installing first and second applications on the computer system at a support provider for the computer system, the support provider being remotely located from the user, wherein the first and second applications are selected for installation on the computer system by the support provider based on a profile of the user to which the computer system is supplied by the support provider;

prior to supply of the computer system from the support provider to the user, restricting access to the first application by the user so as to inhibit execution of the first application by the user;

prior to the supply of the computer system from the support provider to the user, providing unrestricted access to the second application so as not to inhibit execution of the second application by the user;

supplying the computer system, with the first and second applications installed thereon, from the support provider to the user; and responsive to a request from the user to the support provider, removing restrictions on the access to the first application by the user so as not to inhibit execution of the first application by the user, wherein the removing of the restrictions on the access to the first application is performed remotely by the support provider utilizing network communications.

2. The method of claim 1 wherein the restricting of access to the first application by the user is performed utilizing a setting within a system registry of an operating system installed on the computer system.

3. The method of claim 1 wherein the restricting of access to the first application by the user is performed utilizing a setting within a system policy data structure of an operating system installed on the computer system.

4. The method of claim 1 wherein the restricting of access to the first application includes removing an icon for invoking the first application from a graphical user interface provided by the computer system.

5. The method of claim 1 wherein the network communications are propagated over the Internet.

6. The method of claim 5 wherein the network communications are propagated over the Internet utilizing a Digital Subscriber Line (DSL) connection established between the computer system and the support provider.

7. The method of claim 1 wherein the first and second applications are selected for installation on the computer system based on a specified use for the computer system.

\* \* \* \* \*